Aug. 18, 1936.   W. D. FOSTER   2,051,785
FILM HANDLING APPARATUS
Filed March 18, 1929   9 Sheets-Sheet 1
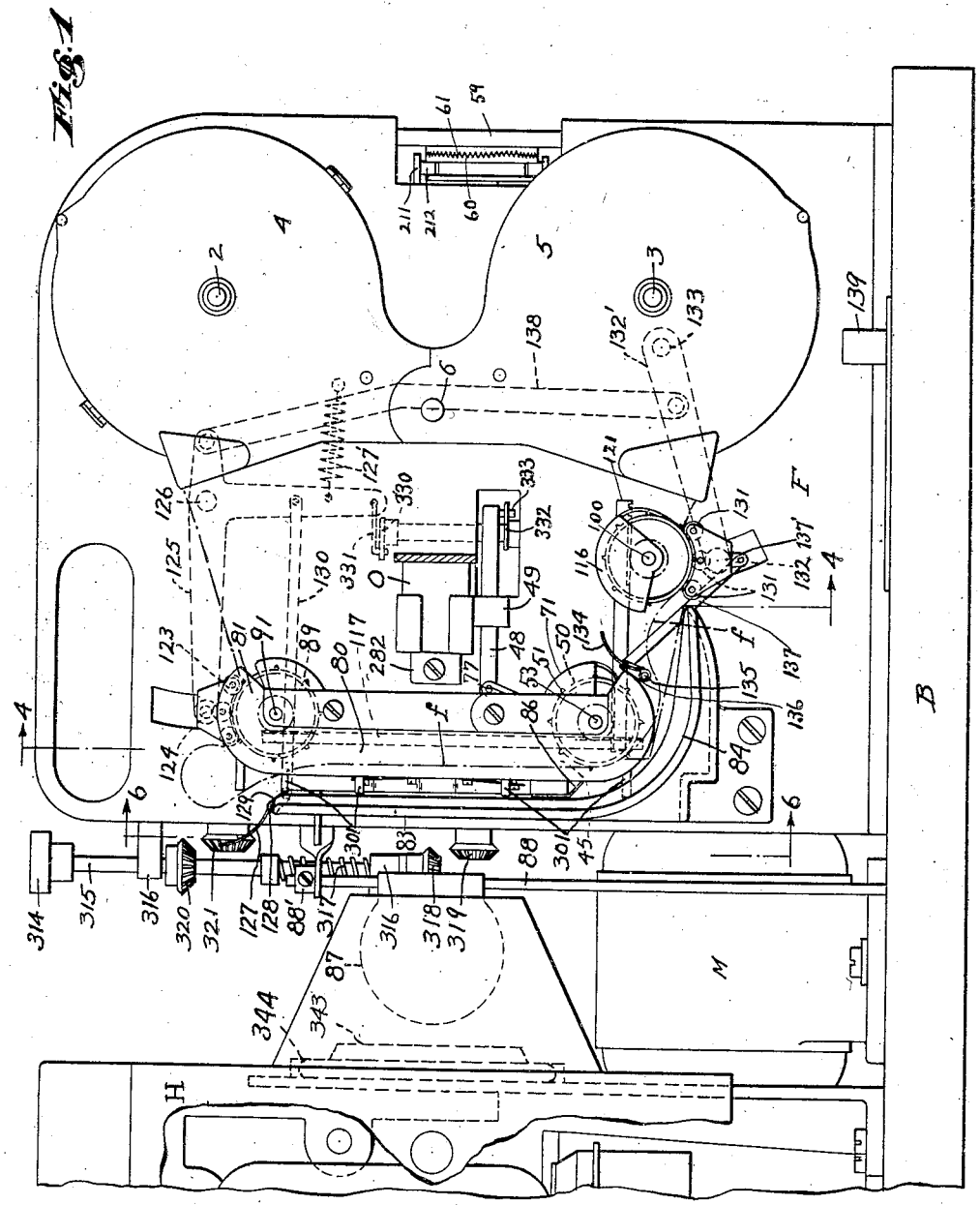
W.D. FOSTER
INVENTOR.
BY Waldo G. Morse
ATTORNEY Aug. 18, 1936.        W. D. FOSTER         2,051,785
              FILM HANDLING APPARATUS
         Filed March 18, 1929        9 Sheets-Sheet 2
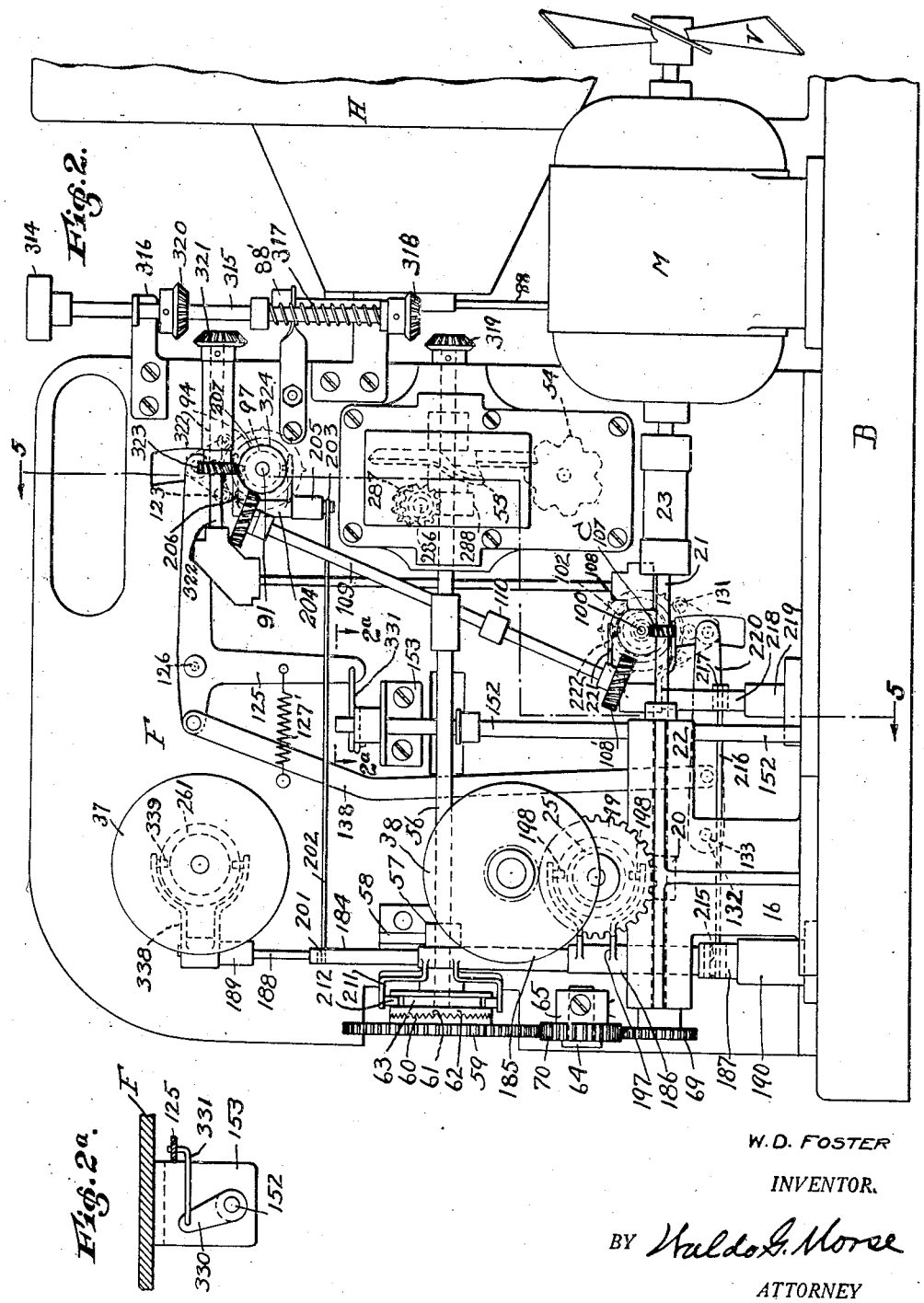
W. D. FOSTER
INVENTOR.
BY Waldo G. Morse
ATTORNEY Aug. 18, 1936.                W. D. FOSTER                2,051,785
                         FILM HANDLING APPARATUS
                         Filed March 18, 1929        9 Sheets-Sheet 3
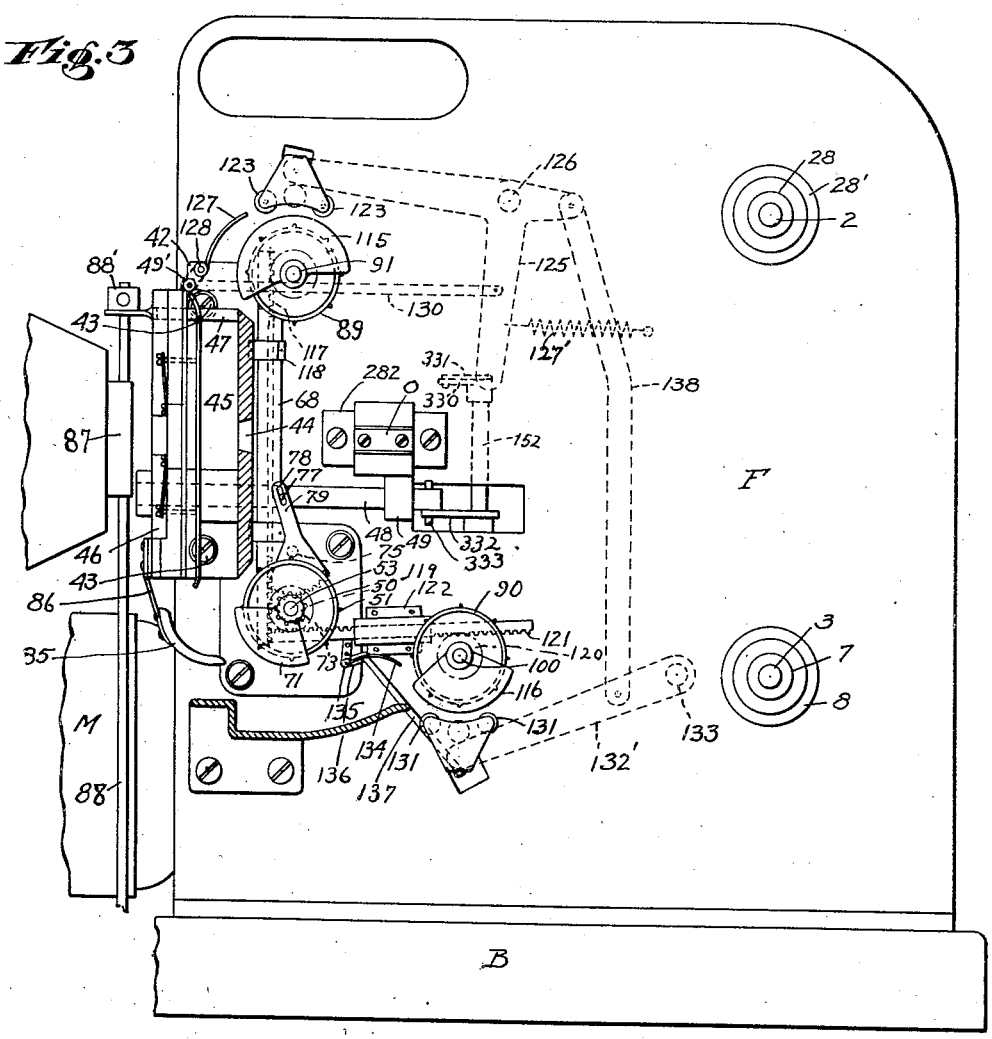
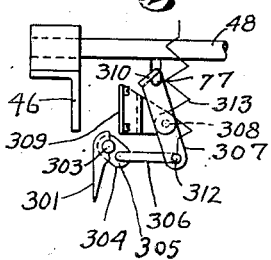
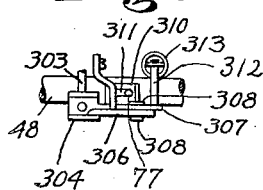
W. D. FOSTER
INVENTOR.
BY Waldo G. Morse
ATTORNEY

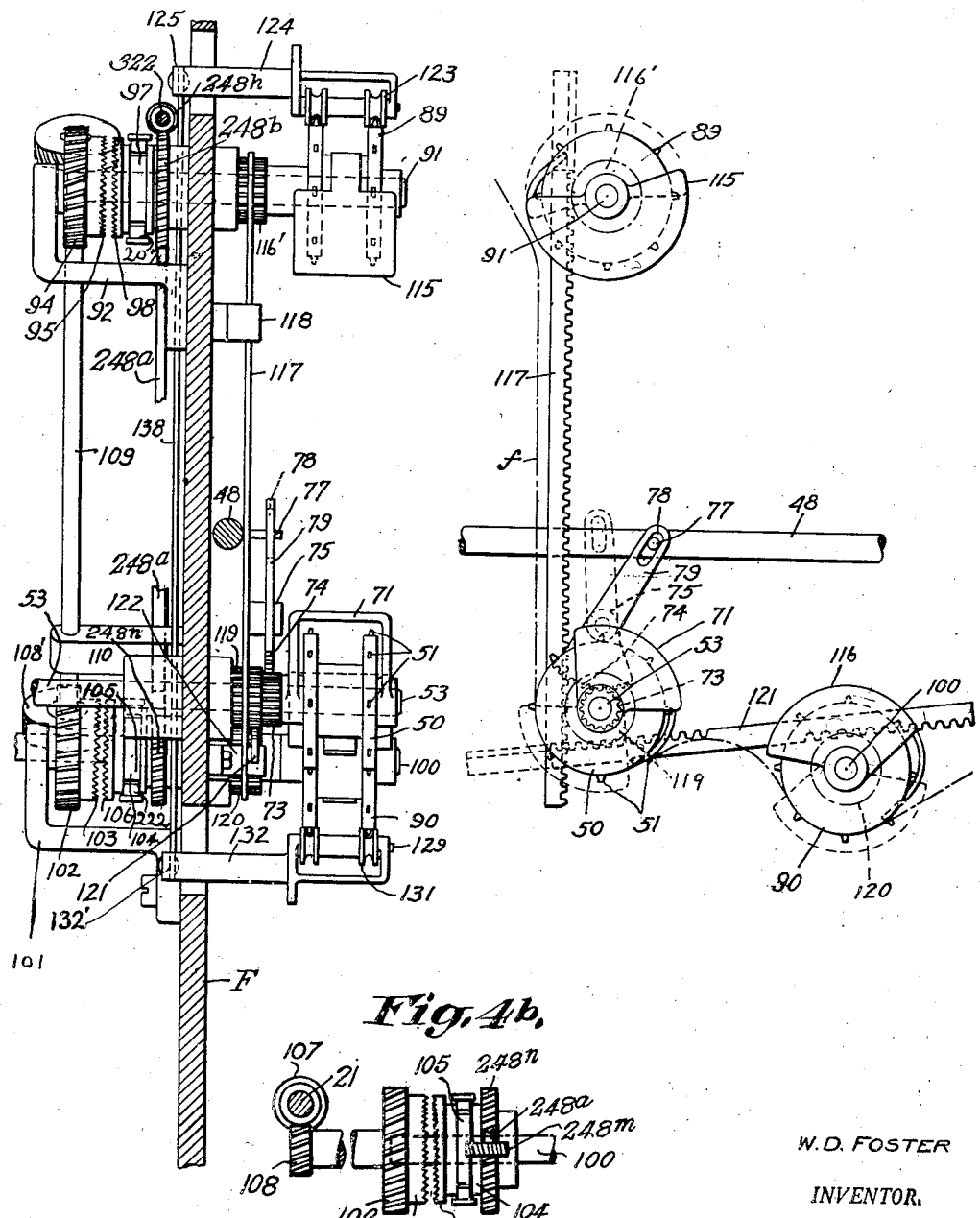

Aug. 18, 1936.   W. D. FOSTER   2,051,785
FILM HANDLING APPARATUS
Filed March 18, 1929   9 Sheets-Sheet 5
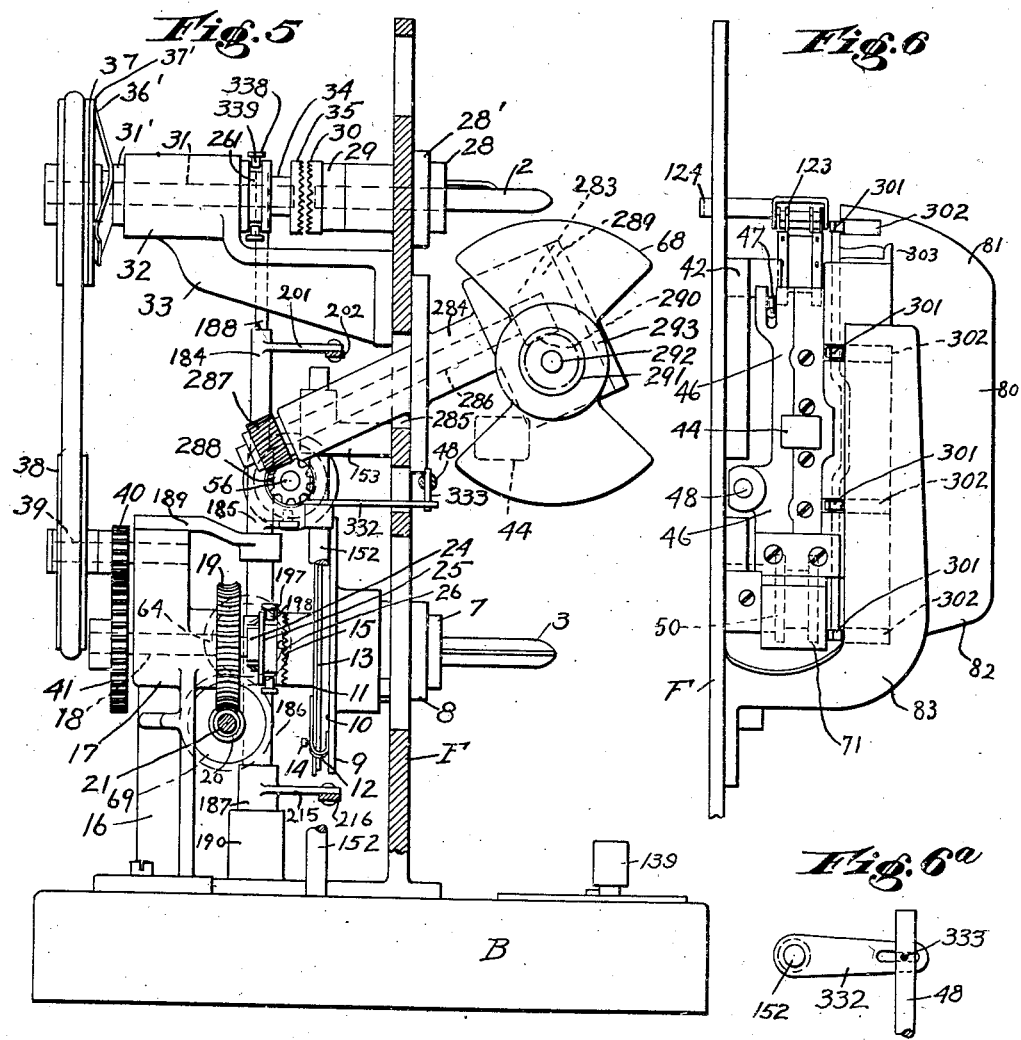
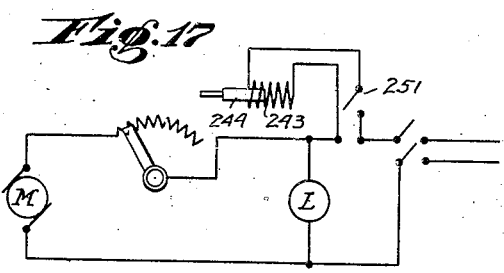
W. D. FOSTER
INVENTOR.
BY Waldo J. Morse
ATTORNEY

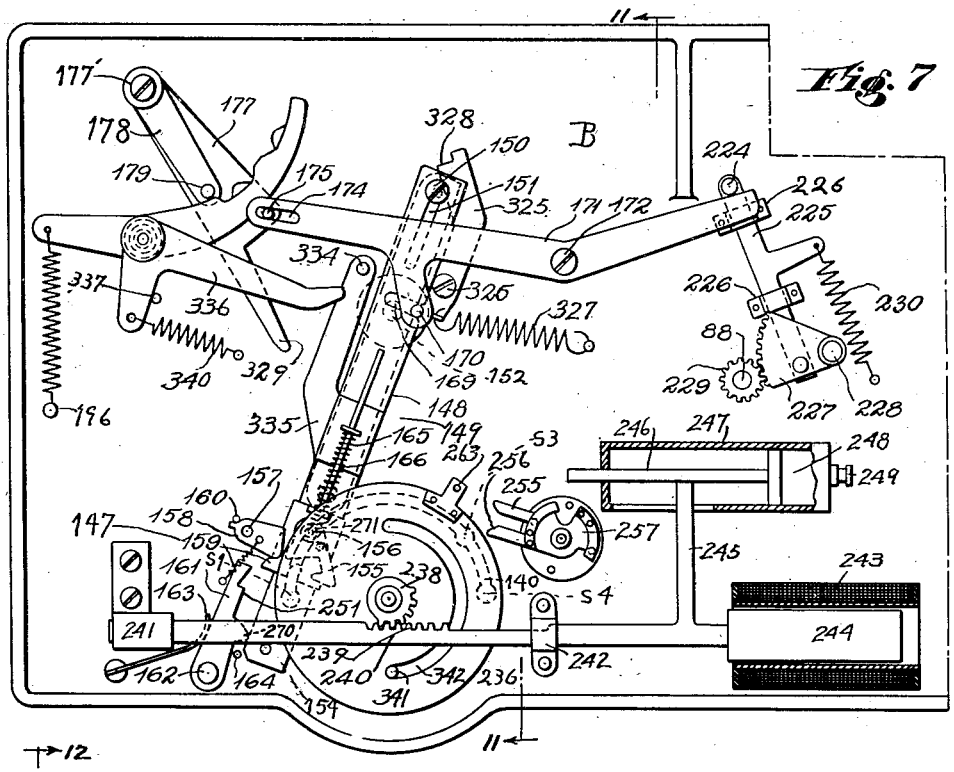
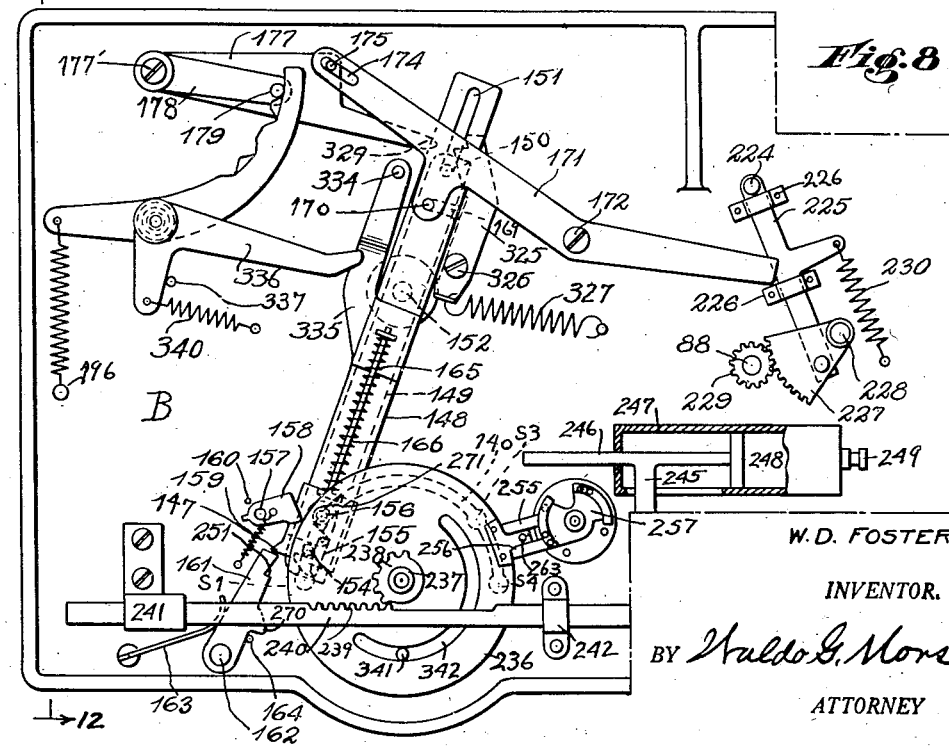

Aug. 18, 1936. W. D. FOSTER 2,051,785
FILM HANDLING APPARATUS
Filed March 18, 1929 9 Sheets-Sheet 7

W. D. FOSTER
INVENTOR.
BY Waldo G. Morse
ATTORNEY

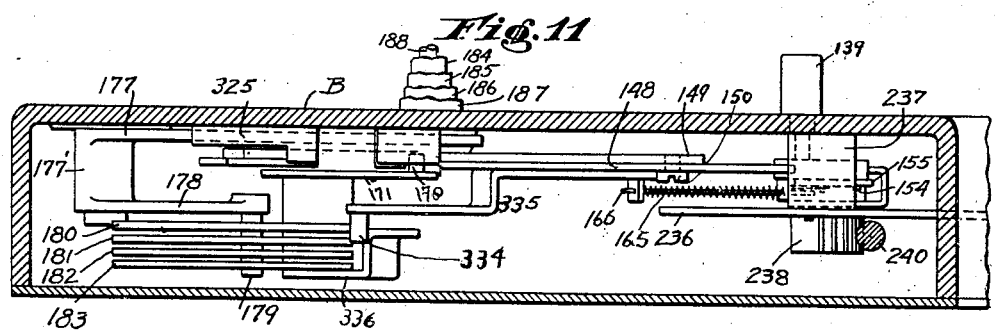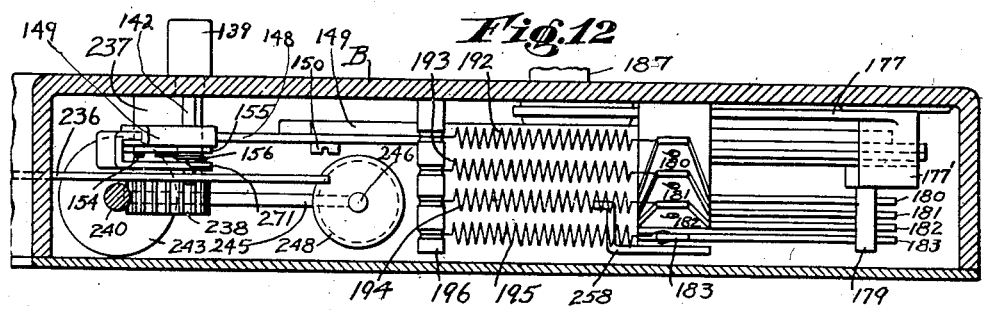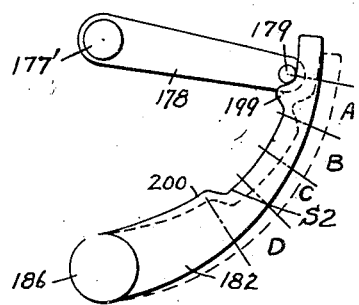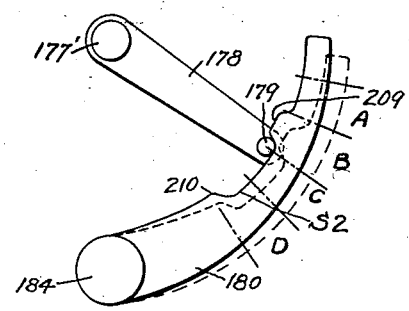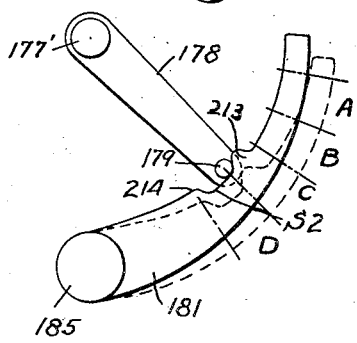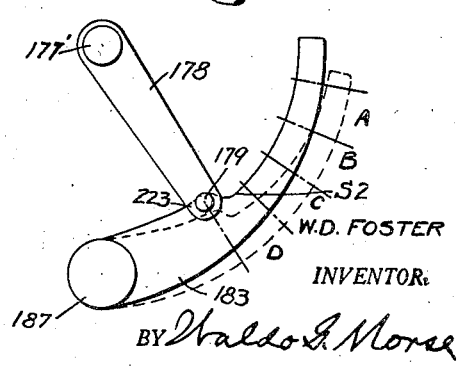

Aug. 18, 1936.  W. D. FOSTER  2,051,785
FILM HANDLING APPARATUS
Filed March 18, 1929  9 Sheets—Sheet 9
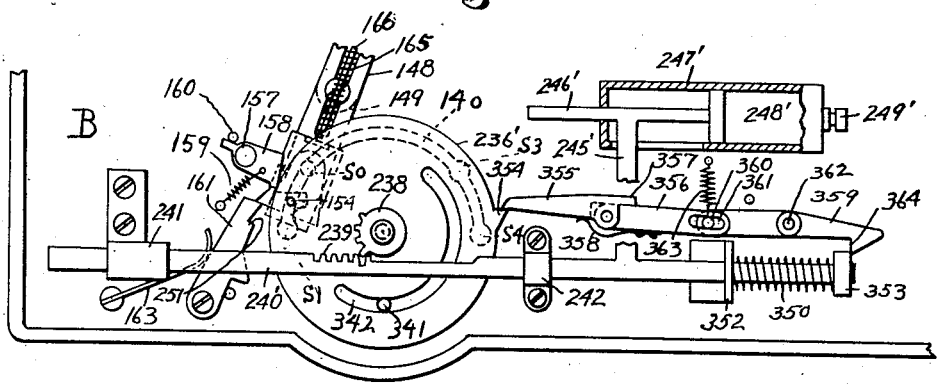
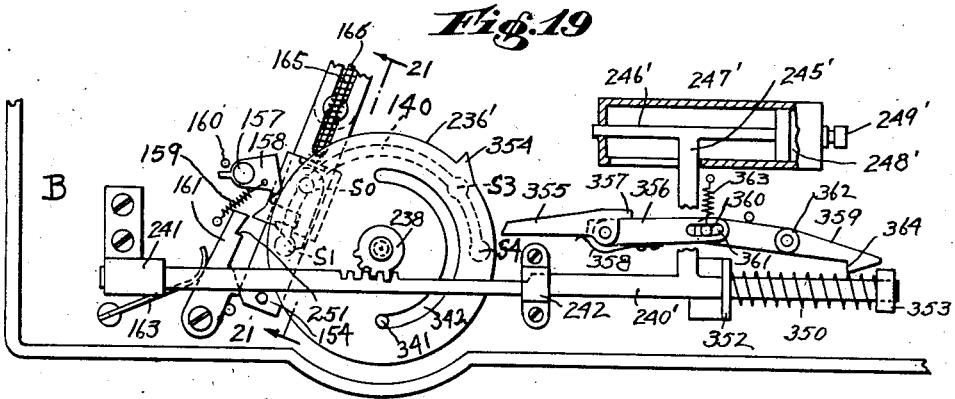
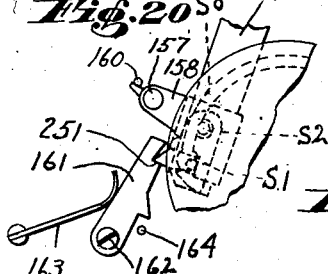
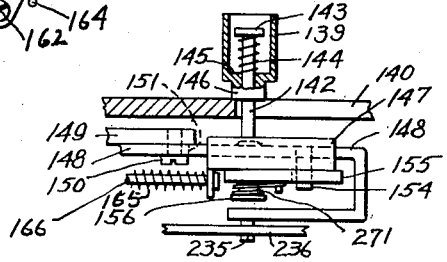
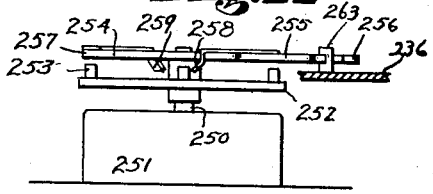
W. D. FOSTER
INVENTOR.
BY Waldo G. Morse
ATTORNEY Patented Aug. 18, 1936

2,051,785

UNITED STATES PATENT OFFICE 2,051,785

FILM HANDLING APPARATUS

Warren Dunham Foster, Washington Township, Bergen County, N. J., assignor to Kinatome Patents Corporation, New York, N. Y., a corporation of New York Application March 18, 1929, Serial No. 347,959

54 Claims. (Cl. 88—17)

The present invention relates broadly to the art of photography, and more particularly to improvements in apparatus adapted for the handling of films, whether for the projection or taking of successive pictures, or for the reproduction or recordation of images representing sound. It will readily be understood, however, that the present invention is applicable to many other uses.

The present application is a continuation in part of my copending application, Serial Number 57,392, filed September 19, 1925, now Patent Number 1,943,303. In said application, I disclosed and claimed separate motive means for the actuation of the control mechanism of the film handling apparatus and for the normal operation of such apparatus, together with means for the definite timing of such actuation and the interposition of suitable periods of rest or dwell whereby certain desired operating conditions could be automatically obtained, as desired in timed or sequential relation. In such parent application, I also disclosed method and means for initially positioning a film in operative relation with the film feeding mechanism of the apparatus, and improved method and means for the actuation and control of the various operations of such apparatus, including, inter alia, the provision of combined manual and automatic control means.

In such parent application, I illustrated my invention as applied to the apparatus described in the copending application of Barton Allen Proctor, Serial Number 54,910, filed September 8, 1925, now Patent Number 1,894,963, in which the compensation for differences in character of movement between the intermittently operating feeding mechanism and the continuously operating supply and take-up members is obtained by means of the tension control system of feeding, as more particularly described in the copending application of Clarkson Ulysses Bundick and said Proctor, Serial Number 44,482, filed July 18, 1925, now Patent Number 1,815,109. An object of the present invention is to apply my invention to the production of loops of slack film whereby compensation is so secured for such differences in character of movement of the intermittently and continuously operated feeding members, such loops being the complete equivalent of and substitute for such tension control system of feeding. An object of my invention is the provision of means for the automatic actuation of the mechanism whereby such conventional loops of slack film are automatically created, in timed or sequential relation to the actuation of the other operative elements of the film handling apparatus.

An object of the present invention is to provide means whereby loops of unsupported slack film may be automatically and accurately provided without attention upon the part of the user, and without subjecting the film to strain.

Another object of the invention is to provide for the sequential or timed operation of various elements in the film handling apparatus in such a manner that such loops will be automatically and accurately produced. A further object is the provision of means whereby the initiation of the actuation of the various film handling operations may be under the complete control of the operator but performed by a special entirely automatic mechanism beyond his control so that he is unable to interfere with the correct operation of the apparatus.

An object of a preferred modification of my invention is the substitution of spring power for electrical power for the initiation of the operation of the apparatus.

The invention is herein illustrated as applied to an apparatus of the general character shown and claimed in such previously mentioned copending application of Barton Allen Proctor, although it will be understood that the invention is not limited to use with any particular form of film handling apparatus.

Other advantages and characteristics of the present invention are apparent in the following description, the attached drawings, and the subjoined claims. Although I am showing one preferred embodiment of my invention, it will be readily understood that I am not limited to any particular construction as changes can readily be made without departing from the spirit of my invention or the scope of my broader claims.

In the drawings:

Figure 1 is a right side elevation of the machine, certain parts of the lamp housing being broken away and certain parts being omitted for clarity.

Figure 2 is a left side elevation of the machine, certain parts being omitted for clarity.

Figure 2a is a detail view of the control link for the film guides and their associated parts.

Figure 3 is a partial right side elevation, broken away to show actuating parts in film threading position, certain parts being omitted for clarity.

Figure 3a is a view of a portion of the mechanism for actuating the film positioning and locking fingers, such fingers being in the inoperative position. Figure 3b is a top view of the same.

Figure 4 is an enlarged skeleton view, taken on the line 4—4 of Figure 1, looking in the direction of the arrows, showing the clutches for the feeding sprockets, and the stripping and protecting shields for the film moving member and the means for operating the same. Figure 4a is an enlarged skeleton elevational view of such shields and the means for operating the same. Figure 4b is a fragmentary side view of the lower part of the structure of Figure 4, looking toward the take-up sprocket shaft.

Figure 5 is a cross section on a line 5—5 of Figure 2 looking in the direction of the arrows, certain parts being omitted for clarity;

Figure 6 is a partial view, taken on the line 6—6 of Figure 1, showing the right side only to illustrate the gate. Figure 6a is a detail view of the gate rod crank lever and associated parts.

Figure 7 is a partial bottom plan view showing actuating levers in "projection-in-motion" position, with the control mechanism at station S1 and with the manual control button at station S0, out of operative contact with the mechanism and about to be moved downwardly into such operative contact.

Figure 8 is a partial bottom plan view showing actuating levers in the "intermediate" position S0, with the control button held locked while the electrical actuating mechanism is about to operate.

Figure 9:
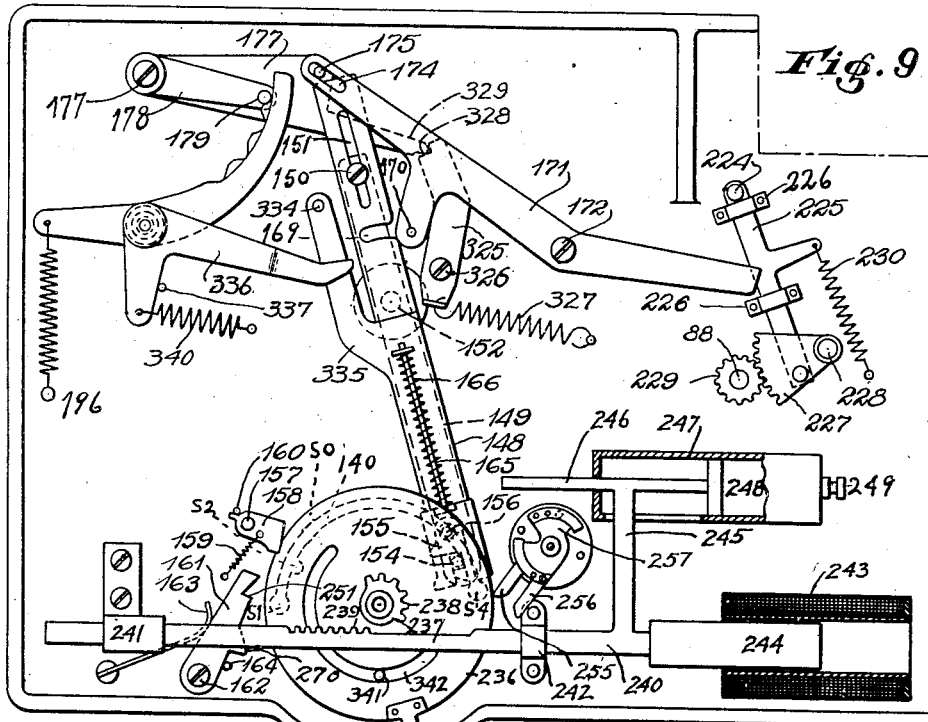

Figure 9 is a partial bottom plan view showing actuating levers in "film threading or changing" position, with the control button at station S3.

Figure 10:
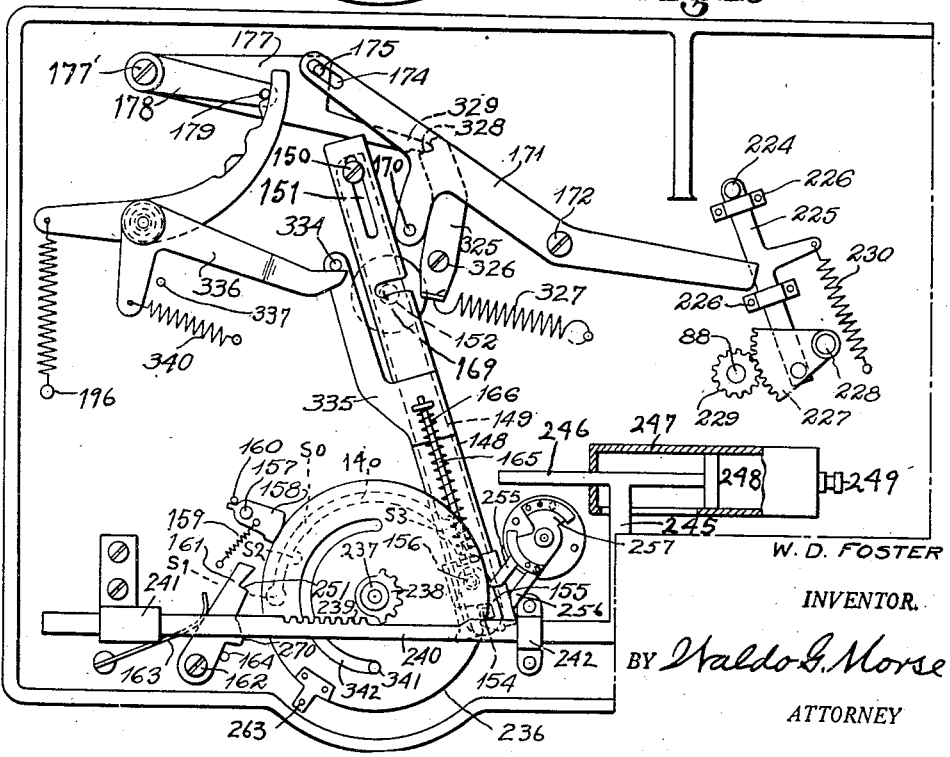

Figure 10 is a partial bottom plan view showing actuating levers in "rewind position", with the control button at station S4.

Figure 11 is an enlarged view, taken upon the line 11—11 of Figure 7, looking in the direction of the arrows, certain parts being omitted for clarity.

Figure 12 is an enlarged view, taken upon the line 12—12 of Figure 8, looking in the direction of the arrows, certain parts being omitted for clarity.

Figure 13 is an enlarged detail view of a portion of the take-up clutch control mechanism.

Figure 14 is an enlarged detail view of a portion of the supply sprocket control mechanism.

Figure 15 is an enlarged detail view of a portion of the intermittent or feeding sprocket control mechanism.

Figure 16 is an enlarged detail view of a portion of the take-up sprocket control mechanism.

Figure 17 (sheet 5) is a wiring diagram of the appartus.

Figure 18 is a partial bottom plan view of a preferred modification, in which simplified motive means is employed for the actuating mechanism, the parts being in the position which they assume immediately prior to the substitution of mechanical control for manual.

Figure 19 is a similar view, after the control mechanism has been placed in the "projection-in-motion" position at station S1, with the manual control button at station S0, out of operative contact with the mechanism and about to be moved into such contact.

Figure 20 is a detail view of a portion of such control mechanism, with the control button at station S2.

Figure 21 is a view, taken on the line 21—21 of Figure 19, locking in the direction of the arrows.

Figure 22 is a detail view of the switch for the solenoid.

In carrying out the present invention, there may be provided an apparatus comprising a supporting base B having mounted thereon a lamp housing H and a supporting frame F upon which are mounted the operating parts of the film feeding and controlling mechanism per se.

Preferably carried by the frame F and projecting from one side thereof in predetermined spaced relationship is a pair of reel receiving spindles 2 and 3, the spindle 2 being adapted for the holding of a reel of film during the feeding movement thereof and adapted to effect rewinding of the film at the conclusion of the feeding movement, while the spindle 3 is adapted to be positively driven during the feeding movement for coiling the film as required.

The film itself may be carried in a combined storage and exhibiting container comprising a pair of containers 4 and 5 having a pivotal connection 6 whereby the containers may be relatively separated to a predetermined extent to expose the desired length of film therebetween, or it may be supported in any appropriate manner.

The spindle 3, which will hereafter be referred to as the driving or take-up spindle, is journaled for rotation in a suitable bearing 7 in an enlarged boss 8 in the frame F. A friction driving member 9 is secured to the left hand end of the spindle, as viewed in Figure 5. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus 13 being maintained in position by adjusting screws 14. Projecting rearwardly from the disk 11 is a circular series of closely spaced teeth 15 adapted to be engaged by a clutch hereinafter described in detail by means of which the driving spindle 3 may be rotated through the friction surfaces just described.

Projecting from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located on one side of the frame F. This shaft at its forward end is mounted in spaced bearings 22 carried by the bracket 16 and is connected to a driving motor M preferably through a flexible coupling 23 of any desired or usual construction. By reason of this mechanism, it will be apparent that when the motor M is operated, the shaft 18 will be positively driven through the worm and wheel before referred to. For transmitting this rotational movement from the shaft 18 to the spindle 3 at will there is provided a collar 24 mounted upon the inner end of the shaft 18 for rotational movement therewith and longitudinal movement relatively thereto and including an extension, having therein a groove 25, and terminating in closely spaced teeth 26. By moving such collar 24 to the right, as viewed in Figure 5, the teeth are projected to bring them into engagement with the corresponding teeth 15 whereby a positive drive is immediately established for the driving spindle. This clutch will hereinafter be referred to as the driving spindle or take-up spindle clutch.

The spindle 2, which will hereinafter be designated the rewinding spindle, or, when the context makes such phrasing desirable, as the delivery or supply spindle, is mounted similarly to the driving spindle 3 in a bearing 28 carried by the frame F, an enlarged boss 28' being provided coaxial with such bearing and spindle, and has secured to one end a collar 29 from which project closely spaced teeth 30. Extending in alignment with the rewinding spindle 2 is a shaft 31 suitably journalled in a bearing 32 carried by a bracket 33 illustrated as secured to the frame F. Mounted on the inner end of the shaft 31 for rotation therewith and longitudinal movement relatively thereto is a sleeve 34 having an enlarged end from which project teeth 35 which are adapted to engage with the teeth 30 and constitutes a rewinding or supply spindle clutch which may be generally similar in construction and operation to the construction of the driving spindle clutch. Upon movement of the collar 34 to the right as viewed in Figure 5, the teeth 35 will be brought into contact with the teeth 30 whereby the rewinding spindle 2 may be operated for effecting a rewinding of a previously displayed length of film.

For driving the shaft 31 there may be provided a collar 31' pinned to the shaft 31 and bearing against a flat spring 36' which forces a fibre disk 37' against a face of a pulley 37. The pulley 37 is mounted in line with a similar pulley 38 mounted on the outer end of a spur shaft 39 secured in the bracket 16. Also mounted on the shaft 39 is a spur gear 40 adapted to be driven by a similar, but preferably larger, gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

It will readily be understood by those skilled in the art that this provision of a yielding drive for the shaft 31 especially in combination with the belt and pulley drive, prevents the forward or "leader" end of the film, which is attached to the take-up spindle 3, being torn loose therefrom at the conclusion of the re-winding cycle.

Mounted on the frame F adjacent the motor M is a gate section 42 preferably secured in any desired manner as by screws 43 against movement relatively to the frame. This section is preferably formed with an aperture 44 through which light may be projected as well understood in the art, and with a film guiding depression extending lengthwise of the section and intersecting the aperture 44 for the travel of the film, such depression preferably being of great depth relatively to the thickness of the film. Cooperating with the section 42 is a relatively movable section 46 preferably guided by a pin 47 projecting outwardly from the section 42, and secured to one end of the gate opening rod 48 slidable through a suitable opening in the gate section 42 and a suitable bearing 49 on the frame F. By reason of this construction, it will be apparent that when the rod 48 is moved to the left as viewed in Figure 1 it will be effective for moving the section 46 away from the section 42 to permit the removal of the film and the insertion of a new film, while movement in the opposite direction will bring the sections into cooperative relation. An idler 49' (Figure 3) may be mounted at the upper end of the section 42 for cooperation with the film below the supply sprocket loop, later described.

For effecting the desired intermittent feeding motion of a film in position in the gate, there may be provided a feeding sprocket 50 having film engaging teeth 51 adapted to engage usual perforations substantially peripherally positioned in the film f. This sprocket is mounted on a shaft 53 extending transversely through the frame F and carrying at its opposite end a star wheel 54. This star wheel, which may be of any well known construction, is adapted to be intermittently driven by means of a sectional cam 55 secured adjacent one end of a shutter shaft 56 journalled at one end of a grease casing C within which are mounted the sectional cam 55 and star wheel 54, and at its opposite end journaled in a suitable bearing 57 carried by a bracket 58 projecting from the frame F.

Mounted loosely upon the shaft 56 adjacent the opposite end thereof, (Figure 2) is a gear 59 upon the inner surface of which are mounted the closely spaced teeth 60 which engage with the teeth 61 which project forwardly from the collar 62 mounted in a long bearing upon the shaft 56 for rotational movement therewith and longitudinal movement relative thereto, such collar including the groove 63.

Intermediate the gate section 42 and the objective lens O the shutter 68 may be positioned. This shutter may be mounted as in the casting 283 adapted to be secured directly to one side of the main frame F and over a shaft receiving extension 284 passing through an opening 285 in the frame. Mounted in the extension 284 is a shaft 286 carrying at one end a spiral gear 287 adapted to mesh with a suitable gear 288 on the shaft 56, preferably positioned with the casing C. The opposite end of the shaft 286 extends into an enlargement 289 and is provided with a spiral gear 290 meshing with a suitable gear 291 on a longitudinally extending shaft 292. The shaft 292 at one end carries the shutter 68 which may be secured in position by the driving disk 293. The casting 283 may be shaped to receive the objective lens holder 282, or such holder, as illustrated in Figure 1, may be attached directly to the frame F. It will be understood that the lubrication for the shafts 286 and 292 and the gears 287, 288, 290, and 291 is provided by the solidified oil or other suitable lubricant which fills the box C, extension 284, and enlargement 289 in which the sectional cam 55 and the star wheel 54 are mounted.

Secured to the end of the driving shaft 21, and in line with the gear 59, is a gear 69 which through the gear 70 mounted upon the shaft 64 supported in the bracket 65 is effective for driving the shutter shaft 56 from the drive shaft. By reason of this construction, it will be apparent that when the collar 62 and the teeth 61 are moved to the left as viewed in Figure 2 the shutter shaft 56 is rotated by the motor M.

As is clearly shown in Figures 4 and 4a, cooperating with the sprocket 50 and normally occupying the position illustrated in Figure 1 of the drawings, is a stripping shield 71 mounted loosely upon the sprocket shaft 53. Secured to the inner side of the shield 71 is a pinion 73 with which meshes an arcuate rack 74 having a pivotal mounting 75 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 4a for the purpose of opening the relatively separable gate sections, will effect rotation of the rack in a counter-clockwise direction as viewed in this figure, thereby rotating the shield in a clockwise direction. This rotational movement of the shield will be effective for engaging the film f and stripping the same from the sprocket preparatory to the removal of the film from the apparatus. During the application of a new film or during rewinding, it will remain in this position, preferably covering all of the teeth of the sprocket which are exposed during the feeding of the film. Thus the threading operation of the film is greatly expedited, and the film completely protected from all teeth during such changing operation or during rewinding.

For further assisting the threading movement, the relatively fixed gate section 42 is provided with a projecting guide 80 having a generally curved contour for gradually guiding the film over the fixed gate section, the guide having a curved and inclined end 81 for insuring passage of the film over the sprocket and an oppositely inclined and curved end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower extending end 84 having a function corresponding to that of the curved end 82 of the guide member 80. Supported from one end of the movable gate section by the spring 86 is a shoe 85 curved to generally conform to the curvature of the sprocket 50, the contour of the innner surface accommodating the teeth 51 of the sprocket. These guides and shoe cooperate in a manner, as will be readily apparent from the drawings, to permit a film to be positioned between the gate members by merely moving the same laterally relative to its normal direction of travel through the gate and to be removed by a similar movement in the opposite direction. It will be readily understood by those skilled in the art that the above construction is also adapted for use under conditions in which the end of the film is initially introduced at one end of the gate and moved therethrough. The movement of the shoe 85, later described, is effective to place the film in operative contact with the sprocket 50. This greatly lessens the time required for threading new film into position, and enables the operation to be performed satisfactorily by an unskilled operator.

When the apparatus is utilized for so-called "still" projection of pictures and during film threading or rewinding, it is necessary of desirable to provide means in the path of travel of the light rays for protecting the film against danger of injury by reason of undue temperature conditions. For effectively shielding the film during such period, there is provided a trap or shield 87 composed of suitable material such as copper screen of suitable mesh carried by a shaft 88 having one end journaled in a bearing 88' projecting from the frame F and having its other end suitably journaled in the supporting base B. This shaft is adapted to be periodically operated in accordance with the character of operation of the machine.

In order bodily to position the film in proper lateral relation to the film moving means and to the gate, there may be provided a positioning mechanism of the type disclosed and claimed in the copending application of Barton Allen Proctor Serial Number 187,980, filed April 30, 1927, now Patent Number 1,944,033, and in his copending application, Serial Number 348,633, filed March 20, 1929, now Patent Number 1,944,037 which is a continuation in part of said application and in part of his copending application, Serial Number 54,910, filed September 8, 1925.

As will be apparent from Figures 1, 3a, 3b and 6 there are provided film positioning fingers 301 of such nature that when retracted they lie entirely within the recess 302 within the area of the fixed gate section. Suitably attached to such fingers, is the connecting rod 303 to which movement is applied through the arm 304, in an opening 305 in which there is inserted the link 306 which in turn is attached to the lever 307 having a pivotal mounting 308 carried by the bracket 309 projecting from the gate section 42. The end of the lever 307 opposite to that to which the link 306 is attached is turned substantially at right angles to the body portion to provide an annular portion 310 which is substantially arcuate and adapted to receive a relatively long slot 311 in which the pin 77 moves. The link 306 is preferably continued beyond the plane of the lever 307 to provide a post 312 for cooperation with the tension spring 313 so positioned as to snap the lever 307 in one direction or the other, after it has been moved a predetermined distance in such direction, the elongated slot 311 constituting a lost motion connection between the parts.

By reason of this construction, it will be apparent that when the rod 48 is moved to the left as viewed in the drawings, it will be effective for rotating the lever 307 in a counter-clockwise direction and effecting thereby similar rotational movements of the fingers 301 from the locking position shown in Figures 1 and 6 to the inoperative position shown in Figures 4a and 4b. As such fingers 301 are moved into a position substantially normal to the longitudinal axis of the rod 303 and within the limits of the fixed gate section, the gate section 46 is moved relatively to the section 42 thus opening the gate and permitting the removal of a previously displayed film and the insertion of another. Movement of the rod to the right, however, will perform the opposite function. The fingers 301 will be rotated to the left, as viewed in Figure 4a, immediately with the beginning of the closing movement of the gate, and will at once sweep completely into the gate and into the film path generally and into proper lateral position relative to the feeding sprockets any film which may have been positioned within the general area of the gate or near to the sprockets. Such bodily positioning will take place well in advance of the completion of the closing movement of the gate and of the completion of the movement of the shoes and guides relatively to the sprockets, thus insuring the proper positioning of the film and precluding the possibility of an edge of the film being caught by the side of the gate or the perforations in the film being other than in proper lateral alignment with the teeth of the sprockets.

Conveniently positioned above and below the gate, I place the conventional continuous sprockets 89 and 90, the former hereafter called the supply sprocket, to draw film from the supply reel, and the latter, hereafter called the take-up sprocket, to take film away from the intermittent or feeding sprocket 50 and move it toward the take-up reel.

The supply sprocket 89 I preferably position within the curved upward portion 81 of the guide member 80 so that as the film is placed in the apparatus by a movement lateral to its ordinary course of travel therethrough, it will be placed in operative position relative to such sprocket. As is clearly shown in Figure 4, I mount such sprocket 89 upon the shaft 91, which is supported by the main frame and by the bracket 92. Loosely mounted upon the shaft 91, I place the spiral gear 94 to the right side of which is attached the serrated disk 95. Further to the right, I mount upon the shaft 91 for longitudinal movement relative thereto and rotational movement therewith the clutch collar 96 with the annular depression 97 for cooperation with the clutch fingers later described and terminating to the left in the serrated disk 98 for appropriate engagement with the serrated disk 95.

For actuating the take-up sprocket 90, similar mechanism may be provided. As is likewise clearly shown in Figure 4, I mount such sprocket 90 upon the shaft 100 which is supported by the main frame and by the bracket 101. Loosely mounted upon the shaft 100, I place the spiral gear 102 to the right side of which is attached the serrated disk 103. Further to the right, I mount upon the shaft 100 for longitudinal movement relative thereto and rotational movement therewith the clutch collar 104 with the annular depression 105 for cooperation with the clutch fingers later described and terminated to the left in the serrated disk 106 for appropriate engagement with the serrated disk 103.

The power train for the gears 94 and 102 may be as follows: To the extremity of shaft 100 (Figure 2), there is pinned the gear 107 meshing with the gear 108 pinned to the main power shaft 21 and thus continuously rotating the spiral gear 102 and the gear 108' which engages therewith, such gear 108' being pinned to the shaft 109 which is mounted in the bracket 110 upon the main frame F. To the opposite end of such shaft, there is pinned the gear 111 which drives the gear 94.

Suitable housings, not shown, may be supplied for all gears if desired, and the entire rear portion of the apparatus may be covered by a casing not shown. If desired, the entire apparatus may be mounted in a cabinet.

Cooperating with the continuously driven sprockets 89 and 90, there are provided stripping and protective shields 115 and 116 similar in operation to the shield 71 which cooperates with the feeding sprocket 50.

The shield 115 is mounted upon the shaft 91, and has pinned to its inner or left hand extension, as viewed in Figure 4, a pinion 116' which meshes with a toothed bar 117 supported as in the bearing 118 and at its opposite end engaging with the pinion 119 which is mounted for movement with the pinion 73.

Similarly, the shield 116 is mounted upon the shaft 100 and has pinned to its inner extension, viewed as above, the pinion 120 which meshes with a toothed bar 121, supported as in the bearing 122, and at its opposite end engaging with the pinion 119 which is mounted for movement with the pinion 73.

Each shield terminates in an inwardly curved extension, narrower than the axial distance between the teeth of the sprocket, thus, as is common in the motion picture art, stripping the film from the sprocket during the feeding operation and hence preventing it from following the teeth too far. It will be recognized that such stripping is entirely different from the primary function of such shields—to wit, the bodily removal of the film from the feeding members and its complete protection therefrom.

The operation of such shields will be obvious from Figure 4a. As the rod 48 is moved, in the manner previously described it will be effective for operating the shield 71, and with it, the shields 115 and 116. Thus the movement of the rod 48 to the left as viewed in Figure 4a will be effective to move all shields from the full line positions to those shown in dotted line, in timed relation to the opening of the gate, thus removing the film from the teeth of the sprockets and completely shielding it therefrom.

Film guides cooperating with the gate and with the feeding mechanisms are provided.

A guiding element, preferably consisting of three rollers 123, relieved as is common in the motion picture art, is mounted upon the right of the arm 124, as viewed in Figure 4, which extends through an appropriate opening in the main frame F, from the right angled plate 125, pivoted as upon the stud 126 extending from the back of the frame, such guiding element being held in cooperative relation with the supply sprocket 89 by the tension of the spring 127'. A second guiding element, preferably consisting of a curved plate 127 (Figure 1), is pivotally mounted upon the pin 128, extending from the main frame adjacent the upper portion of the gate. To such pin is attached the arm 129 which is connected to the lower portion of the plate 125 by the link 130.

A similar guiding element, preferably consisting of three rollers 131, relieved as is common in the motion picture art, is mounted upon the arm 132, which extends through an appropriate opening in the main frame F, from the plate 132',, which plate is pivoted upon the stud 133 extending from the back of the frame. A second guiding element, preferably consisting of a curved plate 134, is pivotally mounted upon the pin 135, extending from the main frame adjacent the lower portion of the gate. Attached to such plate 134 is the arm 136 which by means of a pin extending therefrom into an elongated slot of the link 137 is operated by the arm 137', likewise by means of a pin operating in an elongated slot, the arm 137' being attached to the arm 132.

To actuate the guiding elements positioned adjacent the lower portion of the gate in timed relation with the guiding elements positioned adjacent the upper portion of the gate, the plates 125 and 132' are joined by the link 138.

By reason of such construction, it will be evident that when the plates 125 and 132' are moved in a direction away from the axes of the sprockets 89 and 90, as viewed in Figure 1 or 2, by means later described, the guiding rollers 123 and 131 will likewise be moved away from the sprockets 89 and 90 and the guiding plates 127 and 134 will be moved toward the film, thus completing the track or path for the film from the supply sprocket through the gate to the take-up sprocket, such movements of such guiding elements being effective to facilitate the positioning of a new film or the edge-wise removal of one already displayed. Similarly, the contrary movement of the plates 125 and 132' will be effective to bring the guiding elements 123 and 131 in cooperative relation with the sprockets 89 and 90 respectively, thus positioning the film thereupon and retaining it in cooperation therewith and to move the guiding plates 127 and 134 away from the film track, thus permitting the unimpeded production of the loops of slack film, in the manner later described.

In an apparatus in which it is desired to position the film by a lateral movement thereof relative to its normal path of travel therethrough, the guiding elements 127 and 134 may include a flange or outer section curved in a direction away from such path of travel as shown in United States Patent 1,868,252, dated July 19, 1932. In an apparatus in which it is desired to position the film by the end-wise travel thereof through such path of travel, such guiding elements may be either straight-sided or may include a flange or outer section curved in a direction toward the film as is shown in the co-pending application of Warren Dunham Foster and Frederick Davenport Sweet, Serial Number 352,525, filed April 4, 1929. Either of such constructions, under the circumstances stated, will assist in the initial positioning of the film.

For controlling the operation of the apparatus in the manner desired, there is preferably provided a single control member in the form of a knob or button 139 projecting through an arcuate slot 140 in the supporting base B. This slot is so shaped as to provide five operating stations designated respectively S1, S2, S0, S3 and S4. The button 139 is adapted to be moved so that the control mechanism will occupy any one of these stations. With the control mechanism at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the control button at the intermediate position, station S0, mechanical timing of the actuation of the control mechanism becomes automatically operative. With the button in position at station S3, the respective parts of the apparatus are in such position as to permit the positioning of a film therein or the removal of a film which has just been fed therethrough. It will be understood that the movement of the button from station S0 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding.

The control mechanism actuated by the control button 139 is to a large extent shown in Figures 7 to 22, both inclusive, Figures 7, 8, 9, 10 and 20 illustrating the change in the position of the parts following the movement of the control mechanism to the respective stations. The control button 139 is attached to the control mechanism in such manner that the connection therebetween is automatically destroyed or reestablished in accordance with the operating requirements of the apparatus. Such button may be mounted upon the pin 142 having a head 143 against one side of which bears one end of a compression spring 144. The opposite end of such spring bears against a flange 145 extending inwardly from the control button 139. By reason of this construction, it will be apparent that the button may be moved vertically on the pin 142 but that the spring 144 will normally be effective for urging the button downwardly. At its lower end, the button 139 has a collar 146 of a diameter substantially to conform to the contour of the slot 140 as enlarged at each of the respective operating stations, except station S0, whereby with the button in its lower position accidental movement from one of these stations is prevented. The lower end of the pin 142 is attached to the sleeve 147 which is slidably mounted upon the lever 148. Such lever 148 is mounted upon the lever 149. The headed pin 150, attached to the lever 149, extends through a slot 151 adjacent one end of the lever 148. The lever 149 is keyed or otherwise secured to one end of a gate control rod 152 journaled in a bearing bracket 153 projecting from the rearward side of the main frame F. Being secured to the gate control rod 152 which is capable only of a turning movement about its longitudinal axis, the lever 149 is restricted in movement to rotation only. The combined sliding and rotating lever 148 is effectively mounted on the rotating lever 149 for rotational movement simultaneously therewith and sliding movement independently thereof. Projecting downwardly from the lever 148 is a pin 154 with which the hook 155 pivoted upon the pin 156 attached to the sleeve 147 is adapted to cooperate.

Pivoted upon the pin 157 substantially in line with that portion of the slot 140 extending from station S3 to station S0 is the block 158, normally urged downwardly by the spring 159, upward movement being limited by the pin 160 with which the left hand projection of the block is adapted to contact. Positioned below such block is the pawl 161 pivoted as upon the pin 162 and urged to the right by the spring 163 against the pin 164. Urging the sleeve 147 downwardly as viewed in Figure 7 or 8, there is provided the spring 165 mounted about the rod 166 which may be supported in any desired manner by such sleeve and by the lever 148.

By reason of the above construction, it will be evident that when the combined rotating and sliding lever structure is rotated to the left as viewed in the above mentioned figures from the position S3 slightly beyond the position S0, the left projecting nose of the hook 155 engages with the block 158 and is thereby forced to the right from the position shown in Figure 9 to that shown in Figure 7, thus destroying the relation between the control button 139 and the actuating lever 148 and permitting the power-operated portion of the control mechanism to complete the actuation of the apparatus wholly independently of the user.

At a point intermediate its length, the combined rotating and sliding lever 148 is furnished with the transversely extending recess 169 adapted to cooperate with the pin 170 projecting from the lever 171, pivoted upon the pin 172. It will thus be apparent that after the pin 170 has entered the slot 169, the downward movement of the control lever 148 will be effective to move the lever 171 and through such movement, in the manner hereafter described in detail, to actuate the entire apparatus. Such movement of the control lever 148 is obtained in the manner hereinafter described.

In the slot 174 in one end of such lever 171 is mounted the pin 175 attached to the control plate 177 which by means of the collar 177' is attached for rotation to the control plate 178 in the other end of which plate is inserted the post 179 which operates the feeding control arms 180, 181, 182, and 183. To such arms are attached the coaxial upwardly extending sleeves 184, 185, 186 and 187 respectively, the rotation of which is effective to actuate the various feeding clutches. Such sleeves surround the control rod 188 which operates the re-winding spindle clutch. Such sleeves and rod are journalled for rotation in the base of the machine and in the bearings 189 and 190 extending from the main frame.

As will be clearly seen from Figure 12, the springs 192, 193, 194, and 195, attached suitably to control arms 180, 181, 182, and 183 respectively and to the post 196, are employed to hold such control arms in contact with the post 179.

Reference to Figures 13, 14, 15, 16 and 2 will make clear the operation of the control arms and sleeves. Such figures are arranged in the order of operation of the respective parts, not of their physical arrangement.

The take-up spindle clutch is controlled by arm 182 and sleeve 186, as shown in Figures 13 and 2.

The forked arms 197 may extend from the sleeve 186 and carry pins 198 which engage the groove 25 of the take-up spindle clutch. The rotation of the rod 178 in a clockwise direction as viewed in Figure 13 will force the post 179 into contact with the protuberance 199 of the arm 182, thus moving such arm to the dotted line position, and similarly rotating the control sleeve 186, and moving the control fingers 198 inwardly as viewed in Figure 2, thus making the take-up spindle clutch operative. Such further movement of the post 179 will cause the arm 182 to move back into the full line position of Figure 13, urged by the spring 194, thus declutching the take-up spindle. As the post 179 is moved over the protuberance 200, it will again move the arm 182 to the right as viewed in Figure 13, thus again actuating the take-up spindle. The effect of the contrary movement of the plate 178 will be obvious.

The supply sprocket clutch is controlled by arm 180 and sleeve 184, as shown in Figures 14 and 2.

Extending from the control sleeve 184 is the arm 201 which operates the link 202 which through the arm 203 is effective to rotate the rod 204 supported by the bearing 205. The forked arms 206, supporting in their outer extremities the fingers 207, extend from such rod 204, such fingers being positioned within the groove 97 of the supply sprocket clutch collar. The rotation of the rod 178 in a clockwise direction as viewed in Figure 14 will force the post 179 into contact with the protuberance 209 of the arm 180, thus moving such arm to the dotted line position, and similarly rotating the control sleeve 184 and moving the control fingers 207 and the supply sprocket clutch collar 96 inwardly, as viewed in Figure 2, thus making such clutch operative. Such further movement of the post 179 will cause the arm 180 to move back into the full line position of Figure 14, urged by the spring 192, thus declutching the supply sprocket. As the post 179 is moved over the protuberance 210, it will again move the arm 180 to the right as viewed in Figure 14, thus again actuating the feeding sprocket. The effect of the contrary movement of the plate 178 will be obvious.

The shutter or intermittent feeding clutch is controlled by the arm 181 and sleeve 185 as shown in Figures 15 and 2.

Extending from such sleeve 185 are the forked arms 211 from the ends of which project the clutch pins 212 which coact with the groove 63 of the collar 60. The rotation of the rod 178 in a clockwise direction as shown in Figure 15 will force the post 179 into contact with the protuberance 213 of the arm 181, thus moving such arm to the dotted line position, and similarly rotating the control sleeve 185 and moving the forked arms 211 and the pins 212 to the left as viewed in Figure 2, thus making the shutter clutch operative. Such further movement of the post 179 will cause the arm 181 to move back into the full line position of Figure 15, urged by the spring 193, thus declutching the intermittent shaft. As the post 179 is moved over the protruberance 214, it will again move the arm 181 to the right as viewed in Figure 15, thus again actuating the intermittent sprocket and shutter. The effect of the contrary movement of the plate 178 will be obvious.

The take-up sprocket clutch is controlled by the arm 183 and the sleeve 187, as shown in Figures 16 and 2.

To such sleeve 187, there may be attached the arm 215 from which the link 216 extends to the arm 217 attached to the shaft 218. Suitably journalled in the bearing 219 and the bracket 220, and having attached thereto the arms 221 carrying the pins 222 which cooperate with the groove 105 in the driving portion of the take-up sprocket clutch. The rotation of the rod 178 will be without effect upon the control plate until the post 179 engages the protuberance 223, thus forcing it into the dotted line position shown in Figure 16, rotating the sleeve 187 and forcing the pins 222 inwardly as viewed in Figure 2, thus actuating the take-up spindle clutch. As the post 179 is moved in a contrary or upward direction, the control arm 183 will again occupy the full line position, thus rendering the take-up sprocket again inoperative.

Immediately prior to the normal projection of pictures in motion, it is necessary to move the shield or screen 87 from its normal light intercepting or protective position to a position out of the path of light. This is positively accomplished through the engagement of the right hand end of the lever 171, as viewed in Figures 7 to 10 inclusive, with the pin 224 extending from the bar 225 guided by the brackets 226 attached to the base B. The other end of such bar 225 is suitably attached to the arcuate rack 227 pivotally mounted upon the pin 228, the teeth of such rack engaging with the pinion 229 attached to the lower end of the shaft 88 which operates the heat screen. The spring 208 suitably attached to an extension of the bar 225 and the base will be effective normally to hold the heat screen in the closed position. It will be readily understood that the first portion of the movement of the combined pivoted sliding lever from the station S0 to the point opposite station S2 will be without effect upon the heat shield but that the heat shield will be moved to inoperative position during the travel from such point to station S1. Thus the heat shield is kept in cooperative relation with the film until the apparatus has been put into full operation.

Power may be applied to the lever 148 and through it to the above described control mechanism as follows:

As is clearly shown in Figure 21, the combined rotating and sliding lever 148 by means of the pin 235 is attached to the disk 236 which is rotationally mounted upon the stud 237 in the base B. By reason of this construction, it will be evident that the rotation of the disk 236, clock-wise as shown in the drawings, will be effective to move the rotating and sliding lever 148 from station S0 to station S1, thus actuating the control members as described above. The mutilated pinion 238, attached to the center of the disk 236, meshes with the teeth 239 cut in the rack bar 240, guided by the bearings 241 and 242. As is clearly shown in Figures 7 and 9, power to move the disk 236 is applied through the solenoid 243, the core 244 of which is attached to the rack bar 240. Likewise attached to the rack bar is the arm 245 which is fixed to the plunger 246 working within the cylinder 247 of the dash-pot 248, the exact timing of which is controlled at will by the adjustable port 249.

The actuation of such solenoid is accomplished by a switch the construction of which is clearly shown in Figure 22. Attached to the post 250 of a standard four point snap switch 251 is the plate 252 into which the four pins 253 are fixed. Loosely mounted upon such post 250 is the actuating plate 254; the left hand portion of which, as viewed in Figures 7 and 8, consists of two arms 255 and 256 and the right hand portion of which, as so viewed, consists of the irregularly shaped portion 257. As is clearly shown in Figure 22, a spring trigger 258 is provided, the left hand of which, as viewed in Figures 7 to 10 inclusive, being inclined. Likewise, a similar trigger 259 is mounted upon the irregularly shaped portion 257 of the actuating plate. Projecting from the disk 236 is a switch actuating pin 263.

To illustrate the actuation of the device to project motion pictures, it will be assumed that the user places the film within the gate and moves the control button from station S3 to the intermediate station S0. Such movement, as will be made fully apparent in a following portion of this specification, will have rotated the gate control rod 152 thereby having retracted the stripping shields 71, 115, and 116, actuated the shoe 85 and the guiding rollers 123 and 131 to bring the film into contact with the sprockets 50, 89 and 90, moved the guides 127 and 134 away from the sprockets 89 and 90, actuated the positioning fingers 301, and closed the gate. When the control button reaches the station S0, connection between it and the lever 148 and disk 236 is destroyed. At the same time, the actuating pin 263 will engage the arm 255, move the actuating plate 254 in a clockwise direction as viewed in the drawings, and, by engagement between the inclined end of the trigger 258 and one of the pins 253, quickly snap the switch 251 into operative position, thus actuating the solenoid which will be effective to move the rack bar 240 from the position shown in Figure 8 to that shown in Figure 7, thus moving the sliding lever 148 from station S0 to station S1, necessarily at a uniform and predetermined speed, against the timing influence of the dash pot. Simultaneously therewith, the control post 179 will move from the position in which it is shown in Figure 13 to that in which it is shown in Figure 16. During its passage through the zone which is indicated as A in Figures 13 to 16 both inclusive, it will actuate the take-up spindle, which will be effective for pulling the film over the ends of the teeth of the various sprockets and completing the engagement between the perforations in the film and such teeth. No other film moving mechanism will be operative in zone A. In zone B, in the manner previously described, such post 179 will actuate the supply sprocket which will thereupon draw a predetermined amount of film from the supply reel into a loop between such sprocket and the intermittent sprocket. As the post 179 moves through zone C, the intermittent sprocket alone will be actuated, for a period slightly greater than one half that in which the supply sprocket was actuated, and will draw down approximately one half of the loop of film which had been previously created between the inmittent sprocket and the supply sprocket. Thus it will be evident that the two necessary loops of unsupported slack film will have been created, one adjacent the supply sprocket and one adjacent the take-up sprocket. During zone D, the post 179 will simultaneously form contact with the protuberances 200, 210, 214, and 223 thus placing all of the film feeding mechanisms in simultaneous operation. Within zone D, the heat protective means will be withdrawn from shielding position. Likewise within zone D, the trigger 259, carried upon the irregular shaped portion 257 of the switch actuating plate 254, will engage with one of the pins 253, thus snapping the switch 251 to inoperative position and de-energizing the solenoid. It will be understood that the inclined end of the spring trigger 258 permits the pins to pass by it without interference when the plate is actuated by trigger 259, and vice versa.

Prior to the movement of the lever 148 downwardly from station S0, the sleeve 147 and the manual control button carried thereby, as has been previously described, are held by the engagement of the bottom of the sleeve 147 with the top of the pawl 161. As the lever 148 completes its downward movement to station S1, the pawl 161 will be forced to the left by engagement between the extension 270 thereupon and the side of the lever 148. At this point, such parts will be in the position shown in Figure 7. Thereupon the spring 165 will move the control sleeve 147 and the control button 139 downwardly. The hook 155 will pass first to the left of the pin 154 and thereafter, urged by the spring 271, will move to the right and engage therewith thus reestablishing the connection between the manually operable control button 139 and the control mechanism and locking the control mechanism at station S1. Such locking action is completed shortly before the solenoid is de-energized, owing to the momentary lag in the clearance of the contacting surfaces in the switch. For the purpose of further illustration, it will be assumed that the user wishes to examine one picture at leisure. He will manually move the control button back toward station S0 and then slightly toward the right into the station S2, as is shown in Figure 20. At such point, the post 179 will be upon the line S2 in Figures 13 to 16 inclusive, all clutches then being inoperative and the heat shield being in light intercepting position.

If, after having examined one picture projected motionless, the user wishes to show additional still pictures, he may move the knob 314 downwardly, thus depressing the rod 315 held by the bracket 316 against the compression of the spring 317 thus placing the gear 318 in mesh with the gear 319 attached to the rearward end of the shaft 56 and the gear 320 in mesh with the gear 321 attached to the rearward end of the auxiliary feeding shaft 322, mounted in any suitable fashion upon the rear of the frame F and carrying upon its forward end the spiral gear 323 meshing with the spiral gear 324 attached to the shaft 91. Any conventional and well-known means may be employed to transmit the power of the shaft 322 to the shaft 100 which drives the take-up sprocket. Thus he is able to rotate all the sprockets and the shutter. In returning to the operation of pictures in motion, it is impossible for him to move the control button from station S2 to station S1 without proceeding to the intermediate position station S0 and thereupon actuating the control mechanism whereby the loops will be accurately re-formed since the shoulder 251' of the pawl 161 will be locked in engagement with the sleeve 141.

As the control button is moved from station S1 to station S0, the switch actuating plate 254 will be reset by the movement of the actuating pin 263 against the arm 256.

It may be assumed that after the projection of a single image from the film or the repetitious projection thereof, it is desired to change the film, or that in starting operation it may be necessary to move the parts of the apparatus into such position that a film may be threaded therein. Under such circumstances the control button will be manually moved from station S2 or station S1 through station S0 to station S3. Such movement will be effective for moving the combined swinging and sliding lever structure against the shouldered side of the detent 325, which is pivoted on the stud 326 under the influence of the spring 327 so that its projecting shoulder 328 will engage with the tooth 329 of the lever 171 before the pin and the slot have been removed from cooperative relation, thus holding locked in inoperative position all the clutch control means, dash-pot and spring and consequently the loop or slack producing mechanism. As the control button 139 is further rotated to the right as viewed in Figure 9, the pin 170 and the recess 169 will be completely removed from cooperative relation and the gate control rod 152 will be rotated in a counterclockwise direction.

Such rotation of the gate control rod is effective for opening the gate, for moving the guides 123, 127, 131 and 134 and their associated parts to film threading position, and for so actuating the stripping shields 71, 115 and 116 as to effect the desired bodily removal of the film from the sprockets 50, 89 and 90 and the shielding of such sprockets so as to facilitate the threading of a new film into position or to permit the rewinding of a film. Such movement is also effective to move the positioning fingers 301 to inoperative position.

Adjacent its upper portion there is secured to the gate control rod 152 an arm 330 to which is attached a link 331 attached to the plate 125 previously described (Figure 2a). Movement of the control button from station S0 to station S3 will be effective for rotating the gate control rod in a counter-clockwise direction as viewed in Figure 9 and moving the link 331 to the right as viewed in Figure 2 thus moving the film guides to film threading position. When in such position the guiding elements 123 and 131 will be in relatively distant relation to the sprockets 89 and 90 respectively, and the guides 127 and 134 in relatively close relation to such sprockets.

Such rotation of the gate control rod 152 in a counter-clockwise direction as viewed in Figure 9 will also be effective to move the plate 332 attached thereto to the left as viewed in Figure 1, thus through the medium of the pin 333 attached to the gate control rod 48 moving such rod to the left as so viewed, thus separating the gate sections, moving the positioning fingers to inoperative position, and actuating the stripping shields (Figure 6a).

If it is not desired to change a film, the control button may be moved from station S3 to station S4, or may be moved from station S1 or S2 to station S4 without stopping at an intermediate station. This movement will be effective for bringing the pin 334 attached to the plate 335 attached to the sliding and rotating lever 143 into engagement with the lever 336 and moving it from the position shown in Figure 9 to that shown in Figure 10, thus rotating the rewinding spindle control rod 188. At its free end, this control rod carries spaced arms 338, provided with fingers 339, normally lying in the groove 261 of the rewinding clutch sleeve 34. The rotation of the control rod 188 as occasioned by the movement of the control button from station S3 to station S4 will be such as to move the rewinding clutch into operative position, whereby the spindle 2 is connected in driven engagement with the shaft 31, this engagement being such that the film may be rewound by the continued operation of the motor M. It will be readily understood that any undue strain upon the film during or at the conclusion of the rewinding cycle is obviated not only by the slippage between the driving pulley 37 and the collar 31', but also by slippage between the belt and its pulleys 37 and 38 previously described.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 336 moved into inoperative position against the pin 337 by the action of the spring 340.

During the movement of the control button 139 from station S3 to station S0, the combined swinging and sliding lever structure will come into engagement with the detent 325 and swing it in a clockwise direction against the action of its controlling spring 327, to thereby release the tooth 329 of the lever 171 from the holding action of the detent, and permit the lever 171 and its associated parts to be subsequently operated by the solenoid whereby the necessary loops will be formed and the apparatus placed in full operation.

By reference to the drawings, it will be apparent that the pinion 238 and rack 240 will be entirely out of operative contact except between station S0 and station S1. The disk 236 may be guided and its rotational movement limited by the pin 341 in cooperation with the slot 342.

It will be readily understood by those skilled in the art that the loop producing mechanism described in the above portion of this specification may be combined, if desired, with the automatic means for producing a single picture, for controlling the gate and its associated parts, and for actuating the rewinding mechanism disclosed and claimed in the parent application to which reference has been made, or, if desired, one or more of such operations may be automatically actuated and the remainder thereof actuated manually.

Carried by the frame F and positioned in line between the filament of the light source L and the aperture 44 of the gate is a condensing lens 343 carried by the condensing lens casing 344. This condensing lens as is usual in the art concentrates the light upon the aperture. Forward of the gate the objective lens O may be positioned as previously described, for example, within the holder 282.

The combined lighting resistance and ventilating unit may be contained within the housing H. Within this housing may be mounted in any desired manner a lamp L and a reflector, not shown. If desired, a variable resistance or rheostat may be provided for the motor circuit, in order to operate the apparatus at varying speeds.

A fan V may be attached to the rearward end of the armature shaft of the motor. It will be understood that such fan will be in operation concurrently with the operation of the light source.

Preferably the motor is of a constant speed type or any desired form of voltage regulator may be placed in circuit with the motor, to prevent current fluctuations and consequent variations in speed.

A preferred and simplified modification of my invention is shown in Figures 18 and 19. In such modification, the motive power for operating the control mechanism is supplied by a relatively powerful compression spring 350 placed about the rack bar 240' and held in position between the bracket 352 and the head 353 as is clearly shown by the drawings. When the control disk 236' is moved to the position S0, the projection 354 attached to the side thereof trips the arm 355 pivoted upon the left end of the link 356, as viewed in Figures 18 and 19, and normally held with its rightwardly extending portion 357 against the link 356 by means of the flat spring 358. Such movement of the link 356 will be effective for rocking the arm 359 attached thereto by the pin 360 which works in the elongated slot 361. Such arm 359, which is pivoted on the pin 362 will be moved upwardly against the holding action of the spring 363 thereby forcing its tooth 364 upwardly and away from the head 353 of the rod 240', thus permitting the spring 350 to rotate the control disk 236' in a counter clockwise direction from the position shown in Figure 18 to that shown in Figure 19, and thereby to move the control mechanism in the manner previously described, this entire operation being effectuated against the definitely timing action of the dashpot 248'.

It will be understood that when by means of the control button 139 the disk 236' is rotated in a clockwise direction the spring 350 will be compressed and the head 353 held in position by the tooth 364 of the arm 359.

Many of the advantages of the present invention have been set forth in the preceding portion of this specification. Other advantages include the provision of mechanism whereby loops of slack film may be automatically produced. Further advantages arise from the provision of means for the actuation of the mechanism for the production of loops or slack in the film in timed or sequential relation to the actuation of all other operations of the film handling apparatus. Further advantages are the provision of unitary or interlocked control means for the loop producing mechanism and the other elements of the apparatus, such elements including, for example, those which guide or position the film, or retain it in place, or remove it from the feeding means, or protect it therefrom, the gate, film feeding means, take-up, and rewinding mechanism. A further advantage is the use of sprockets which are adapted to move the film for the regular or normal feeding thereof as that portion of the loop creating mechanism which engages the film for the purpose of the initial production of slack therein, thus putting no extra strain whatever upon the film.

Other advantages arise from the locking of the loop producing mechanism so that it is ineffective upon the film under certain conditions, as, for example, when its operation might injure the film.

Additional advantages are the provision of loop producing mechanism which is automatically operated and definitely timed and the provision of separate motive means for initiating the operation of the apparatus and for operating the apparatus thereafter.

Further advantages are the provision of combined manual and automatic control means and the provision of manual means for initiating the operation of the control mechanism and automatic means, with either electrical or mechanical motive means therefor, for operating such mechanism.

A further advantage is the provision of means whereby the various film feeding members may be successively operated.

Still further advantages arise from the provision of control mechanism whereby the various operations of a film handling apparatus may be performed in the desired sequential or timed relation to each other and governed by unitary means.

I claim:

1. In a film handling apparatus, a plurality of film feeding members adapted to engage the same film at the same time, mechanism operatively connected with all of said members and including means for operating one only of said members for a pre-determined period and then stopping said member, and means for thereafter operating each of said other mentioned members for a period which is distinctive and successive relatively to that period for which each of said other mentioned members previously has been operated, and means governing said mechanism and effective for timing the duration of each of said periods.

2. In a film handling apparatus, a plurality of film feeding members adapted to engage the same film at the same time, mechanism operatively connected with all of said members including means for operating one only of said members for a pre-determined period and then stopping said member, means for thereafter operating each of said other mentioned members for a period, each of said last named periods being distinct and successive relatively to that period for which each of said other mentioned members previously has been operated, and means governing said mechanism and effective for timing the starting and stopping of said members to provide intervals between such successive periods.

3. In a film handling apparatus, a plurality of feeding members, a source of power, and mechanism operatively connecting said source of power and all of said members including means for transmitting power from said source to each of said members in succession whereby said members are actuated successively, means for disconnecting such power from any of said members whereby the desired members are maintained motionless and other members are operated, and means for transmitting such power to all of said motionless members simultaneously whereby all of said members are operated concurrently.

4. In a film handling apparatus, a plurality of film feeding members adapted to engage the same film at the same time, a source of power for operating said members, and mechanism interlocking said source of power and all of said members and effective for operatively connecting said source of power with said members, said mechanism including means for first connecting one only of said members with said source of power for a pre-determined period only, means thereafter connecting each of said other mentioned members with said source of power for periods each of which is distinct and successive relatively to that period for which each of said other mentioned members previously has been connected to said source of power, and devices thereafter concurrently connecting all of said members with said source of power for an indefinite period.

5. In a film handling apparatus, two feeding members, means for driving said members in the same direction, a first means for connecting one of said feeding members with said driving means, a second and separate means for connecting the other of said members with said driving means, and control mechanism interlocking the two connecting means and first effecting the operation of said first means and rendering said second means inoperative, and devices thereafter effecting the operation of said second means and rendering said first means inoperative.

6. In a film handling apparatus, a continuous feeding member, an intermittent feeding member, a source of power for said members, a first means for connecting one of said members with said source of power, a second means for connecting the other of said members with said source of power, and control mechanism interlocking both of said means and having devices for first effecting the operation of said first means and rendering said second means inoperative, devices thereafter effecting the operation of said second means and rendering said first mentioned means inoperative, and devices thereafter making both of said means operative for concurrently operating both of said feeding members.

7. In a film handling apparatus, a first toothed feeding member, a second toothed feeding member, said members engaging the same film at the same time, a source of power for both of said members, means necessarily effective for connecting said first member with said source of power and including devices effective a predetermined period thereafter for disconnecting said second member and said power, means necessarily effective for connecting said second member with said source of power and including devices effective a pre-determined period thereafter for disconnecting said second member and said power, and control mechanism interlocking both of said means for first operating said first named means and thereafter operating said second named means.

8. In a film handling apparatus, a first toothed feeding member, a second toothed feeding member, said members engaging the same film at the same time, a source of power for both of said members, means necessarily effective for connecting said first member with said source of power and after a pre-determined period thereafter for disconnecting it therefrom, means necessarily effective for connecting said second member with said source of power and after a pre-determined period thereafter for disconnecting it therefrom, and control mechanism interlocking said means and effective for operating each of said connecting and disconnecting means successively, and means governing said control mechanism and determining the intervals between such successive operations.

9. In a film handling apparatus, a first feeding member, means for continuously operating said first member, a second feeding member, means for intermittently operating said second member, a third feeding member, means for continuously operating said third member, and means for producing slack in the film between said first and second members and between said second and third members, said slack producing means comprising mechanism interlocking all of said operating means and including devices for first actuating said means for operating said first member while maintaining said means for operating said second member without effect thereupon and said means for operating said third member without effect thereupon, and devices effective after a predetermined period to stop the operation of said means for operating said first member, and devices for actuating said means for operating said second member while maintaining said means to actuate said first member without effect thereupon and said means for operating said third member without effect thereupon.

10. In a film handling apparatus, a first feeding member, means for continuously operating said first member, a second feeding member, means for intermittently operating said second member, a third feeding member, means for continuously operating said third member, and means for producing slack in the film between said first and second members and between said second and third members, said slack producing means comprising mechanism interlocking all of said operating means and including devices for first actuating said means for operating said first member for a predetermined period while maintaining said means for operating said second member without effect thereupon and said means for operating said third member without effect thereupon, devices for stopping the operation of said means for operating said first member, and devices for actuating said means for operating said second member while maintaining said means for operating said first member without effect thereupon and said means for operating said third member without effect thereupon, and devices for stopping the operation of said means for operating said second member after a period of substantially half that of such predetermined period during which said means for operating said first member was operated.

11. In a film handling apparatus, a first feeding member, means for continuously operating said first member, a second feeding member, means for intermittently operating said second member, a third feeding member, means for continuously operating said third member, means for producing slack in the film between said first and second members and between said second and third members and for controlling the regular feeding operation of the apparatus, said slack producing and controlling means comprising mechanism interlocking all of said operating means and having devices for first actuating said means for operating said first member while maintaining said means for operating said second member without effect thereupon and said means for operating said third member without effect thereupon, devices for stopping the operation of said means for operating said first member, and devices for actuating said means for operating said second member and for maintaining such operation effective for a period substantially half that of such pre-determined period during which said first member was operated, and devices for actuating all of said operating means concurrently whereby such regular feeding operation is initiated.

12. In a film handling apparatus, operating mechanism effective to occupy a normal projection position and a film threading position, power-operated means for moving said operating mechanism to such normal projection position, manual means for moving said operating mechanism to such film threading position, and an actuating handle connected with both of said means and effective upon movement to one station to actuate said power-operated means and upon movement to another station to operate said manual means.

13. In a film handling apparatus, operating mechanism adapted to occupy a normal projection position and a film threading position, electrically driven means for moving said operating mechanism to such normal projection position, means for controlling the circuit of said electrical means, manually operable means for moving said mechanism to such film threading position, and an actuating member connected with said controlling means and with said manually operable means and effective either for actuating said controlling means whereby said electrical means is made effective to move said mechanism to such normal projection position or for operating such manual means whereby said mechanism is moved to such film threading position.

14. In a film feeding apparatus, a feeding sprocket, a clutch for said sprocket, a control arm connected with said clutch and having formations thereon for determining the operation of said clutch, an operating lever device, connective mechanism between said lever device and said control arm so arranged that the movement of said lever device operates said control arm, said mechanism including a member movable by said lever device and cooperating with each of said formations successively, and means for moving said lever device at a predetermined speed.

15. In a film feeding apparatus, a plurality of feeding members, means for driving said feeding members in the same direction, a separate clutch for connecting each of said feeding members and said separate driving means so that said driving means operates said feeding means to move the film, a rotatable operating member for each of said clutches, connections between said operating members and said clutches whereby the rotation of said operating members operates said clutches, and sequential control means for rotating said operating members in a pre-determined succession whereby said feeding members are successively actuated and thereby move different sections of the same film in the same direction at different times.

16. In a film handling apparatus, a plurality of members for feeding a film, a source of power for operating said feeding members, mechanism for producing a loop of slack in the film for cooperation with said feeding members, means for operating said loop-producing mechanism, actuating means for starting the operation of said loop producing means, and a separate source of power for driving said actuating means.

17. In a film handling apparatus, means for producing a loop of slack film, mechanism for controlling said means for producing said loop, powered means for operating said mechanism, a manually operable actuating member, a connection between said mechanism and said member whereby the operation of said member brings said mechanism into operative relation with said powered means, and means necessarily effective for destroying said connection between said mechanism and said member during the period of operation of said mechanism by said powered means whereby such operation is necessarily carried out independently of said member.

18. In a film handling apparatus, means for producing a loop of slack film, mechanism for controlling said means for producing said loop, powered means for operating said mechanism, a manually operable actuating member, a connection between said mechanism and said member whereby the operation of said member brings said mechanism into operative relation with said powered means, and means necessarily effective for destroying such connection between said mechanism and said member during the period of operation of said mechanism by said powered means whereby such operation is necessarily carried out independently of said member, and means for re-establishing said connection after the conclusion of such operation.

19. In a film handling apparatus, means for producing a loop of slack film, mechanism for operating said means, electrical means for driving said mechanism, a circuit for controlling said electrical means, and a single means effective for bringing said loop producing means and said operating mechanism into operative relation with each other and for making said circuit.

20. In a film handling apparatus, mechanism for producing an unsupported loop of slack film, electrical means including a circuit for operating said mechanism, means independent of said mechanism for closing said circuit whereby said mechanism forms said loop, and means operated by said mechanism after it has formed said loop for breaking said circuit.

21. In a film handling apparatus, a toothed feeding member, means for moving a film over the ends of the teeth of said member in a direction substantially normal to the axis of such teeth for effecting initial engagement between such teeth and the perforations of the film, means for creating a loop of slack film for cooperation with said feeding member, and control mechanism interlocking said moving means and said slack-creating means and effective for first operating said moving means and thereafter operating said slack-creating means.

22. In a motion picture apparatus, intermittent film feeding means, operable means for producing a loop in the film, a light source for directing light upon the film, means for protecting the film from the heat of said light source, and control mechanism interlocking said protecting means and said loop producing means, said mechanism including an actuating member which upon movement to one position operates said loop producing means while maintaining said heat protecting means in protective relation to the film and upon movement to another position renders said protecting means inoperative and said film feeding means operative.

23. In a motion picture apparatus, a feeding member, a source of power, a clutch for transmitting power from said source to said member, a light source for cooperation with a film fed by said member, means for protecting the film so fed from the heat of said light source, a first control means for rendering said clutch operative, a second control means for rendering said clutch operative, and mechanism interlocking all of said means for first rendering one of said control means operative while maintaining said protecting means in protective relation to the film and second rendering the other of said control means operative and removing said protecting means from such protective relation.

24. In a film handling apparatus, a first feeding member, means for continuously operating said first member, a second feeding member, means for intermittently operating said second member, a third feeding member, means for continuously operating said third member, and means for producing slack in the film between said first and second members and between said second and third members, said slack producing means comprising mechanism including devices for first actuating said means for operating said first member and maintaining said means for operating said second member without effect thereupon, and maintaining said means for operating said third member without effect thereupon, devices for stopping the operation of said means for operating said first member, and devices for actuating said means for operating said second member and maintaining said means for operating said first member without effect thereupon and maintaining said means for operating said third member without effect thereupon.

25. In a film handling apparatus, a toothed film moving member, means for moving a perforated film over the ends of the teeth and in a direction substantially normal to the axis of the teeth of said member for effecting initial engagement between such teeth and the perforations of the film, means for producing slack in the film for cooperation with said toothed member, a source of power for driving said toothed member, means for connecting said source of power and said member, and a single control means interlocking all of said aforementioned means to effect a predetermined cooperation therebetween.

26. In a film handling apparatus, a toothed film feeding member, means for moving a film over the end of a tooth thereof in a direction substantially normal to the axis of such tooth whereby engagement between such tooth and a perforation of the film is initially accomplished, means for initially producing slack in the film adjacent said toothed member for cooperation therewith, a source of power for driving said toothed member, means for applying power from said source to said toothed member whereby the regular feeding operation of the film is carried out, and control mechanism for said previously recited means, said control mechanism comprising a movable actuating member and mechanism, connecting said actuating member and said previously mentioned means, for actuating said means for moving the film, whereby the film is initially positioned upon the teeth of said feeding member, upon the first portion of the movement of said actuating member from one of said stations toward another, for operating said means for initially producing slack upon a succeeding portion of such movement of said actuating member, and for operating said power-applying means, whereby the regular feeding operation upon the film is initiated upon the next succeeding portion of such movement of said actuating member.

27. In a film handling apparatus having a plurality of film feeding sprockets, a prime mover for driving said sprockets in the same direction, and means for connecting each of said sprockets to said prime mover, and a sequential control mechanism for said connecting means, said mechanism including a separate control member for each of said sprockets effective for actuating said connecting means for successively connecting to and disconnecting from said prime mover the sprocket to which it is related and means for operating said members in a predetermined sequence for first rendering one of said sprockets operative and inoperative upon the film and thereafter rendering another of said sprockets operative and then inoperative upon the film.

28. The structure described in claim 27 characterized by each of said control members having means for interposing a time interval between the connection and disconnection operations of its related film feeding sprocket.

29. In a film handling apparatus, a feeding member, a source of power, means for first applying the power of said source to said feeding member for operating said member in a given direction for a relatively short predetermined period, means disconnecting said source of power from said member for a short predetermined period, timing means associated with each of said previously stated means for definitely determining each of said periods, and means for applying such power to said member again for continuously operating said member in said direction.

30. In a film handling apparatus, a plurality of film feeding members adapted to engage the same film at the same time and sequentially operable, time controlled mechanism operatively connected with all of said members, said mechanism including means for operating one only of said members for a predetermined period and then stopping the operation of said member, and means for operating thereafter each of said other mentioned members separately for a period, such last named periods being distinct and successive relatively to that period for which each of said other mentioned members previously has been operated.

31. In a film handling apparatus, a continuous feeding member, an intermittent feeding member, a source of power for said members, a first clutch for connecting one of said members with said source of power, a second clutch for connecting the other of said members with said source of power, and control mechanism, said control mechanism including connecting means and timing means therefor, said connecting means interlocking said clutches and including devices for rendering said first clutch effective during a first period while rendering said second clutch ineffective during such period, and devices for rendering said second clutch effective during a succeeding period while rendering said first clutch ineffective during such period, said timing means controlling said connecting mechanism and determining the duration of such periods.

32. In a film handling apparatus, a continuous feeding member, an intermittent feeding member, a source of power for said members, a first clutch for connecting said continuous feeding member with said source of power for selectively transmitting power from said source to said continuous feeding member, a second clutch for connecting the other of said members with said source of power for selectively transmitting power from said source to said other member, and control mechanism, said control mechanism including connecting means and timing means therefor, said connecting means interlocking said clutches and including devices effective during a first period to operate said first clutch whereby said clutch transmits power to said continuous feeding member and effective to operate said second clutch whereby said clutch transmits power to said other feeding member, devices effective during a second and succeeding period to render said first clutch inoperative whereby said clutch does not transmit power to said continuous feeding member and to maintain said second clutch inoperative, and devices effective during a third and succeeding period to operate said second clutch and to maintain said first clutch inoperative, said timing means controlling said devices to determine the duration of such second period.

33. In a film handling apparatus, a continuous delivery member, an intermittent feeding member, a continuous taking-up member, a source of power for said members, a first means for connecting one of said members with said source of power, a second means for connecting another of said members with said source of power, a third means for connecting the other of said members with said source of power, and sequential control mechanism interlocking all of said means, said mechanism comprising a movable actuating member and devices connecting said actuating member with said first means, said second means, and said third means for first operating said first means and maintaining said second and third means inoperative and second for rendering said first means inoperative and operating said second means and maintaining said third means inoperative, and third for maintaining said first means inoperative and rendering said second means inoperative and operating said third means.

34. In a film handling apparatus, a continuous delivery member, an intermittent feeding member, a continuous taking-up member, a source of power for said members, a first means for connecting one of said members with said source of power, a second means for connecting another of said members with said source of power, a third means for connecting the other of said members with said source of power, and sequential control mechanism interlocking all of said means, said mechanism comprising a movable actuating member and devices connecting said actuating member with said first means said second means and said third means for, first, operating said first means and maintaining said second and third means inoperative, and for, second, rendering said first means inoperative and operating said second means and maintaining said third means inoperative, and for, third, maintaining said first means inoperative and rendering said second means inoperative and operating said third means, and for, fourth, operating all of said means concurrently.

35. In a film handling apparatus, a spindle, a plurality of toothed film-feeding members adapted to engage a film which is supported by said spindle, a motor, and connective means interlocking said spindle, said members and said motor and including devices for first operating said spindle alone to move the film into operative relation with the teeth of at least one of said members such teeth being motionless while said film is being moved, and sequentially operable devices thereafter successively actuating each of said members predeterminedly so as to form loops of slack in the sections of the film disposed between such members as are engaged with the film.

36. In a film handling apparatus, a spindle, a plurality of toothed film-feeding members adapted to engage a film which is supported by said spindle, a motor, and connective means interlocking said spindle, said members and said motor and including devices for first operating said spindle alone to move the film into operative relation with the teeth of at least one of said members, such teeth being motionless while the film is moved, sequentially operable devices thereafter successively operating said members for the purpose of forming loops of slack in the sections of the film between such of said members as are engaged with the film, and devices for thereafter concurrently operating said spindle and all of said members whereby the film is subjected to a regular feeding movement.

37. In a film handling apparatus, a plurality of film-feeding members, driving means, a separate clutch for each of said members for operatively connecting and disconnecting each of said members and said driving means, a plurality of spindles, a separate clutch for each of said spindles for operatively connecting and disconnecting each of said spindles and said driving means, sequential control mechanism interlocking all of said clutches for successively operating each of the same, and timing devices for determining the the intervals between each such successive operation.

38. In a film handling apparatus, a plurality of film feeding members, driving means, a clutch for operatively connecting and disconnecting each of said members with said driving means, a plurality of spindles, a clutch for operatively connecting and disconnecting each of said spindles with said driving means, sequential control mechanism interlocking all of said clutches, a single means for actuating said control mechanism movable to a plurality of work positions, said mechanism including means effective upon the movement of said actuating means to one position for rendering the clutch for one of said spindles and the clutches for each of said members successively operative, and effective upon the movement of said actuating means to another position for rendering the clutch for the other of said spindles operative.

39. In a film handling apparatus, a feeding member, a uni-directional, continuously operating source of power for said member, and sequential control mechanism for applying power from said source to said member for automatically carrying out the threading operation, said mechanism including means for first connecting said member and said source for the purpose of operating said member for predeterminedly initially positioning the film in reference to said feeding member, means for second disconnecting said member from said source after a predetermined period, means for third again connecting said member with said source after a predetermined period for the purpose of operating said member for carrying out the regular film feeding operation, and means associated with each of said previously stated means for definitely timing each of said predetermined periods.

40. In a film handling apparatus, film feeding means, a primary source of power, and sequential control mechanism for operatively connecting said feeding means and said source of power, said sequential mechanism comprising a plurality of operable control elements, an actuating member successively movable into engagement with said control elements, means for successively moving said actuating member into operative connection with each of said control elements for successive periods, a connection between each of said elements and said primary source of power effective during the period during which said element is in operative connection with said actuating member for governing the transmission of power from said primary source to said feeding means, a secondary source of power for driving said actuating member, and hand-operated means for applying said secondary source of power to said actuating member.

41. In a film handling apparatus, film feeding means, a primary source of power, and sequential control mechanism for operatively connecting said feeding means and said source of power, said sequential control mechanism comprising a plurality of operable control elements, an actuating member successively movable into engagement with each of said control elements, means for successively moving said actuating member into and out of operative connection with each of said elements for successive periods, each of said elements during the period during which it is in operative connection with said member being effective to govern the transmission of power from said source to said feeding means, a secondary source of power for moving said actuating member, and means adjustable at will for determining the speed of operation of said actuating member.

42. In a film handling apparatus, a feeding member, a clutch for said feeding member, and control mechanism for said clutch, said mechanism including a plurality of different control positions, an actuating member movable from one of said control positions to another and different of said control positions, and operating means operatively connected with said clutch and so positioned as to be engaged by said actuating member during its movement between said control positions, the travel of said actuating member between said control positions bringing it into operative engagement with said operating means and disengaging it therefrom to render said clutch successively operative and inoperative.

43. In a film handling apparatus, a feeding member, a clutch for said feeding member, and control mechanism for said clutch, said control mechanism including an actuating member movable from one control position to another, a movable operating arm disposed adjacent the path of said members between said positions, connections between said operating arm and said clutch for rendering said clutch operative and inoperative upon the movement of said arm, and cam formations upon said arm, said cam formations being positioned at different points along and within the path of said member between said positions so that as said actuating member moves between said positions by engagement with said cam formations it moves said arm to operate said clutch.

44. In a film handling apparatus, a feeding member, a clutch for said feeding member, and control mechanism for said clutch, said control mechanism comprising a movable actuating member, two control positions between which said actuating member is movable, a plurality of movable control means positioned at different places along the path of said actuating member between said positions and so disposed as to be successively engaged by said actuating member as it travels between said positions and to be moved in one direction by such engagement, means for moving said control means in the other direction upon the disengagement thereof by said actuating member as it travels further, means operatively interconnecting each of said control means and said clutch for rendering said clutch operative upon the movement of each of said control means in one direction and inoperative upon the movement of said control means in the other direction, and means for moving said actuating member between said positions.

45. In a film handling apparatus, a feeding member, a clutch for said feeding member, and control mechanism for said clutch, said mechanism comprising an actuating member movable from one control position to another, means for determining the speed of such movement of said actuating member as it passes between said control positions, and operating means connected to said clutch and engaged by said actuating member during its movement between such positions, said control mechanism including devices effective upon the engagement of said actuating member with said operating means as said actuating member moves between such positions for rendering such clutch successively operative and inoperative, said speed determining means timing such successive operations of said clutch.

46. In a motion picture apparatus, a plurality of feeding members, a clutch for each of said members, a movable member for operating each of said clutches, and control mechanism for said operating members, said control mechanism comprising two operating stations and an actuating member movable between said stations, said operating stations being positioned at different points along the path of said actuating member between said stations, and means for moving said actuating member between said stations and into engagement with each of said operating members for operating each of said operating members whereby said feeding members are successively operated.

47. In a motion picture apparatus, a plurality of feeding members, a source of power for driving said feeding members, a clutch for each of said members, an operating member for each of said clutches, and sequential control mechanism for said operating members, said control mechanism comprising an actuating member, movable from one position to another and during such movement successively engaging and operating each of said operating members whereby said feeding members are successively actuated, and time controlled powered means separate from said source of power which drives said feeding members for moving said actuating member between such positions.

48. In a motion picture apparatus, a plurality of feeding members, a source of power for driving said feeding members, a clutch for each of said members, an operating member for each of said clutches, and sequential control mechanism for said operating members, said control mechanism comprising a plurality of control positions, an actuating member movable from one of said control positions to another thereof and during such movement successively engaging and operating each of said operating members whereby said feeding members are successively actuated, and a source of power separate from that which drives said feeding members for moving said actuating member between said control positions.

49. In a film handling apparatus, a delivery member, an intermittent film feeding member, and a taking-up member for engaging a film, an openable gate through which the film passes, means for closing said gate, a motor, sequential control mechanism connecting said motor and said members and including devices movable from a first to a second position and effective during such movement to successively apply power from said motor during predetermined periods to said delivery member and said intermittent feeding member for operating said members for different periods to produce predetermined loops of slack in those sections of the film between said delivery member and said intermittent member and between said intermittent member and said taking-up member, devices that thereafter concurrently apply power from said motor to all of said members whereby said members carry out the regular feeding operation upon the film, electrical means having a circuit for moving said devices from such first to such second position, and means operated by said gate closing means for closing said circuit thereby operating said electrical means and forming the loops.

50. In a film handling apparatus, mechanism operable for producing a loop of slack film, a member predeterminedly movable for actuating said mechanism, electrical means for moving said member for actuating said mechanism for producing said loop, a circuit for said electrical means, means other than said electrical means for moving said operable member, and means actuable by an initial movement of said operable member for controlling said circuit.

51. In a film handling apparatus, mechanism operable for producing a loop of slack film, a member predeterminedly movable for actuating said mechanism, electrical means for moving said member for actuating said mechanism for producing said loop, a circuit for said electrical means, means actuated upon an initial movement of said operable member by the operation of said apparatus for making said electric circuit, and means making secure the predetermined operation of said loop producing mechanism by said electrical means against interference by said operator.

52. In a film handling apparatus, a feeding member, a clutch for said feeding member, and control mechanism for said clutch, said control mechanism including an actuating member movable from one control position to another, a movable operating arm disposed adjacent the path of said member between said positions, connections between said operating arm and said clutch for rendering said clutch operative and inoperative upon the movement of said arm, cam formations upon said arm, said cam formations being positioned at different points along and within the path of said member between said positions so that as said actuating member moves between said positions by engagement with said cam formations it moves said arm to operate said clutch, and spring means for moving said member between said positions.

53. In an apparatus for handling a perforated film, means for taking up the film, a toothed member adapted to feed the film, operable means for producing slack in the film adjacent said toothed member, and control mechanism operatively interconnecting said taking up means and said slack-producing means and including instrumentalities which first initiate the operation of said taking up means whereby a perforation of said film is drawn into relation with a tooth of said member, second, stop the operation of said taking up means, and, third, actuate said slack-producing means.

54. In an apparatus for handling a perforated film, means for taking up the film, a toothed member adapted to feed the film, operable means for producing slack in the film adjacent said toothed member, and control mechanism operatively interconnecting said taking up means and said slack-producing means and including instrumentalities which first initiate the operation of said taking up means whereby a perforation of said film is drawn into relation with a tooth of said member, second, stop the operation of said taking-up means, third, actuate said slack-producing means, and, fourth, initiate the operation of said taking-up means and said toothed member.

WARREN DUNHAM FOSTER.